(12) United States Patent
Tarkiainen et al.

(10) Patent No.: US 11,293,765 B2
(45) Date of Patent: Apr. 5, 2022

(54) SYSTEM AND METHOD FOR ROUTING AND REORGANIZATION OF A VEHICLE PLATOON IN A SMART CITY

(71) Applicant: PCMS Holdings, Inc., Wilmington, DE (US)

(72) Inventors: Mikko Tarkiainen, Tampere (FI); Matti Kutila, Tampere (FI); Ari Virtanen, Fempäälä (FI); Pertti Peussa, Tampere (FI)

(73) Assignee: PCMS Holdings, Inc., Wilmington, DE (US)

( * ) Notice: Subject to any disclaimer, the term of this patent is extended or adjusted under 35 U.S.C. 154(b) by 345 days.

(21) Appl. No.: 16/461,311

(22) PCT Filed: Dec. 6, 2017

(86) PCT No.: PCT/US2017/064851
§ 371 (c)(1),
(2) Date: May 15, 2019

(87) PCT Pub. No.: WO2018/106774
PCT Pub. Date: Jun. 14, 2018

(65) Prior Publication Data
US 2020/0064140 A1 Feb. 27, 2020

Related U.S. Application Data

(60) Provisional application No. 62/431,736, filed on Dec. 8, 2016.

(51) Int. Cl.
*G01C 21/34* (2006.01)
*G05D 1/02* (2020.01)
(Continued)

(52) U.S. Cl.
CPC ....... *G01C 21/3407* (2013.01); *G05D 1/0291* (2013.01); *G08G 1/0116* (2013.01); *G08G 1/22* (2013.01)

(58) Field of Classification Search
CPC ........ G08G 1/087; G08G 1/0116; G08G 1/22; G08G 1/096811; G01C 21/3407; G05D 1/0291
See application file for complete search history.

(56) References Cited

U.S. PATENT DOCUMENTS 4,931,767 A 6/1990 Albrecht
5,504,577 A 4/1996 Jan
(Continued)

FOREIGN PATENT DOCUMENTS

CN 105318884 A 2/2016
CN 105446338 A 3/2016
(Continued)

OTHER PUBLICATIONS

International Preliminary Report on Patentability for PCT/US2017/064851 dated Jun. 11, 2019, 7 pages.
(Continued)

*Primary Examiner* — Ramsey Refai
(74) *Attorney, Agent, or Firm* — Invention Mine LLC

(57) ABSTRACT

Systems and methods described herein are provided for determining a platoon configuration for a group of vehicles, determining a set of routes connecting two locations, determining for each route segment the platoon configurations supported and the availability of roadside units on the route segment, and selecting a route from the set of routes connecting the two locations. A route may be selected based on the availability of a roadside unit (RSU) to request an extended time period for a green light to enable a length of the platoon to traverse through an intersection prior to the (Continued)

time period ending. Systems and methods described herein may enable a reconfiguration of a platoon to meet a platoon size restriction for a segment of the selected route.

20 Claims, 12 Drawing Sheets

(51) Int. Cl.
  *G08G 1/01* (2006.01)
  *G08G 1/00* (2006.01)

(56) References Cited

U.S. PATENT DOCUMENTS

| | | | |
|---|---|---|---|
| 6,151,539 A | 11/2000 | Bergholz | |
| 8,060,308 B2 | 11/2011 | Breed | |
| 8,352,111 B2* | 1/2013 | Mudalige | G08G 1/163 |
| | | | 701/24 |
| 8,649,962 B2* | 2/2014 | Davis | G01C 21/3492 |
| | | | 701/117 |
| 8,855,835 B2* | 10/2014 | Kumabe | G05D 1/0295 |
| | | | 701/2 |
| 8,937,546 B1 | 1/2015 | Baron, Sr. | |
| 9,008,890 B1 | 4/2015 | Herbach | |
| 9,024,786 B1 | 5/2015 | Jones | |
| 9,079,587 B1 | 7/2015 | Rupp | |
| 9,110,196 B2 | 8/2015 | Urmson | |
| 9,165,470 B2* | 10/2015 | Mudalige | G05D 1/0293 |
| 9,171,465 B2 | 10/2015 | Katayama | |
| 9,188,981 B2 | 11/2015 | Israelsson | |
| 9,188,985 B1 | 11/2015 | Hobbs | |
| 9,396,661 B2* | 7/2016 | Okamoto | G05D 1/0293 |
| 9,940,840 B1* | 4/2018 | Schubert | B60F 1/00 |
| 2002/0067289 A1 | 6/2002 | Smith | |
| 2003/0069683 A1 | 4/2003 | Lapidot | |
| 2008/0134955 A1 | 6/2008 | Morrow | |
| 2009/0157461 A1* | 6/2009 | Wright | G06Q 10/06 |
| | | | 705/7.23 |
| 2012/0086582 A1 | 4/2012 | Sinisa | |
| 2013/0035901 A1 | 2/2013 | Breed | |
| 2014/0032108 A1 | 1/2014 | Zeng | |
| 2014/0081573 A1 | 3/2014 | Urmson | |
| 2014/0210645 A1 | 7/2014 | Sharma | |
| 2014/0316865 A1* | 10/2014 | Okamoto | G05D 1/0293 |
| | | | 705/14.1 |
| 2015/0066355 A1 | 3/2015 | Siegel | |
| 2015/0109146 A1 | 4/2015 | Drobot | |
| 2015/0199904 A1 | 7/2015 | Lee | |
| 2015/0241880 A1 | 8/2015 | Kim | |
| 2015/0266488 A1 | 9/2015 | Solyom | |
| 2015/0266490 A1 | 9/2015 | Coelingh | |
| 2015/0292894 A1 | 10/2015 | Goddard | |
| 2016/0019782 A1 | 1/2016 | Alam | |
| 2016/0025505 A1 | 1/2016 | Oh | |
| 2016/0086285 A1 | 3/2016 | Jordan Peters | |
| 2016/0146618 A1 | 5/2016 | Caveney | |
| 2016/0169690 A1 | 6/2016 | Bogovich | |
| 2016/0171521 A1 | 6/2016 | Peter | |
| 2017/0356746 A1 | 12/2017 | Iagnemma | |
| 2018/0113460 A1 | 4/2018 | Koda | |

FOREIGN PATENT DOCUMENTS

| | | | |
|---|---|---|---|
| EP | 2023125 A1 | 2/2009 | |
| EP | 2063255 A3 | 5/2009 | |
| EP | 2972096 B1 | 1/2016 | |
| GB | 2524384 A | 9/2015 | |
| JP | 5891314 B2 | 3/2016 | |
| KR | 20140117836 A | 10/2014 | |
| KR | 101581286 B1 | 7/2015 | |
| NL | 1040228 C | 12/2014 | |
| WO | 1998004931 A1 | 2/1998 | |
| WO | 2010103504 A1 | 9/2010 | |
| WO | 2014139821 A1 | 9/2014 | |
| WO | 2014148989 A1 | 9/2014 | |
| WO | 2015151055 A1 | 10/2015 | |
| WO | 2016087901 A1 | 6/2016 | |
| WO | 2016163929 A1 | 10/2016 | |

OTHER PUBLICATIONS

International Search Report and Written Opinion of the International Searching Authority for PCT/US2017/043947 dated Oct. 13, 2017.

Arage, A., et al., "Effects of Water and Ice Layer on Automotive Radar" In Proceedings of the German Microwave Conference 2006, (2006), 5 pages.

International Transportation Forum, "Automated and Autonomous Driving; Regulation under uncertainty". Corporate Partnership Board Report, OECD/ITF (2015), 32 pages.

Rasshofer, R.H., et al., "Influences of Weather Phenomena on Automotive Laser Radar System" In Advances in Radio Science, 9, pp. 49-60, (2011).

Rigole, P. J., "Study of a Shared Autonomous Vehicles Based Mobility Solution in Stockholm". Masters of Science Thesis, at Industrial Ecology Royal Institute of Technology, (2014), 41, pages.

Krajzewicz, D., et al., "Evaluation of the Performance of city-wide, autonomous Route Choice based on Vehicle-to-vehicle-Communication". For presentation and publication in 87th Annual Meeting Transportation Research Board, Jan. 2008, 13 pages.

Glaser, S., et al., "Maneuver-Based Trajectory Planning for Highly Autonomous Vehicles on Real Road with Traffic and Driver Interaction". Submitted to IEEE Transaction on Intelligent Transportation System, (2009), 15 pages.

Resende, P., et al., "Real-time Dynamic Trajectory Planning for Highly Automated Driving in Highways". In Intelligent Transportation Systems (ITSC), 2010 13th International IEEE Conference, (2010), 7 pages.

ERTRAC, "Automated Driving Roadmap". ERTRAC Task Force, Connectivity and Automated Driving, Version 5.0., dated Jul. 21, 2015, 48 pages.

Imobility Forum, "Roadmap: Automation in Road Transport". Version 1.0., May 2013, 37 pages.

ETSI, "Intelligent Transport Systems (ITS); V2X application; Part 1: Road Hazard Signalling (RHS) application requirements specification". ETSI TS 101 539-1 V1.1.1 (Aug. 2013) standard specification, 38 pages.

SAE International, "Automated Driving". SAE J3016 standard brochure. Web Archive dated Jul. 18, 2017, at: https://webarchiveorg/web/20170718182646/http://www.sae.org/misc/pdfs/automated_driving.pdf.

Wikipedia, "Disdrometer". Web Archive dated Jul. 21, 2017, from: https://web.archive.org/web/20170721025925/https://en.wikipedia.org/wiki/Disdrometer.

Leinonen, J., et al., "A Climatology of Disdrometer Measurements of Rainfall in Finland over Five Years with Implications for Global Radar Observations". In Journal of Applied Meteorology and Climatology, vol. 51, Feb. 2012, pp. 392-404.

Hyvonen, M., et al., "Assistive Situation Awareness System for Mobile Multimachine Work Environments". In IEEE Transactions on Intelligent Transportation Systems, vol. 16, No. 6, Dec. 2015, pp. 3403-3413.

Jokela, M., et al., "Road Condition Monitoring System Based on a Stereo Camera". In IEEE 5th International Conference on Intelligent Computer Communication and Processing, Cluj-Napoca, (2009), pp. 423-428.

Viikari, V., et al., "Automotive Radar Technology for Detecting Road Conditions. Backscattering Properties of Dry, Wet, And Icy Asphalt," European Radar Conference, (2008)., EuRAD 2008, pp. 276-279.

Naboulsi, M., et al., "Fog Attenuation Prediction for Optical and Infrared Waves". Optical Engineering. vol. 43. Issue 2., Feb. 2004, pp. 319-329.

Harikumar, R., et al., "Variation of Rain Drop Size Distribution with Rain Rate at a Few Coastal and High Altitude Stations in Southern Peninsular India". In Advances in Space Research, vol. 45, Issue 4, Feb. 15, 2010, pp. 576-586.

(56) References Cited

OTHER PUBLICATIONS

International Preliminary Report on Patentability for PCT/US2017/043947 dated Feb. 5, 2019, 7 pages.
International Search Report and Written Opinion of the International Searching Authority for PCT/US2017/064851 dated Mar. 14, 2018.
Baudouin Dafflon et al.: "A layered Multi-Agent Model for Multi-Configuration Platoon Control:", Proceedings of the 10th International Conference on Informatics in Control, Automation and Robotics, Dec. 31, 2013 (Dec. 31, 2013), pp. 33-40, XP055454494, DOI: 10.5220/0004632500330040. ISBN: 978-989-8565-71-6.
Madeleine El-Zaher et al.: "Vehicle Platoon Control with Multi-Configuration Ability", Procedia Computer Science, vol. 9, Dec. 31, 2012 (Dec. 31, 2012), pp. 1503-1512, XP028517172, ISSN: 1877-0509, DOI 10.1016/J.PROCS.2012.04.165.
Lioris, J., et al., "Platoons of Connected Vehicles Can Double Throughput in Urban Roads". Arxiv.org, arXiv:1511.00775v1, available at: https://arxiv.org/abs/1511.00775v1, Nov. 3, 2015, pp. 1-17.
Lioris, J., et al., "Platoons of Connected Vehicles Can Double Throughput in Urban Roads". Arxiv.org, arXiv:1511.00775, available at: https://arxiv.org/abs/1511.00775v2, Feb. 2, 2017, pp. 1-20.
Guo, C., et al., "Self-Defensive Coordinated Maneuvering of an Intelligent Vehicle Platoon in Mixed Traffic". 15th International IEEE Conference on Intelligent Transportation Systems, Sep. 16-19, 2012, pp. 1726-1733.
Eilers, S., "Information Model for Platoon Services". European Commission Seventh Framework Program, Companion D3.2, Sep. 30, 2015, pp. 1-44.
Marjovi, A. et al., "Specifications for the Enhancement to Existing LDM and Cooperative Communication Protocol Standards". AutoNet2030, 7th Framework Program, Project No. 610542, Feb. 6, 2015, 136 pages.
Marjovi, A. et al., "Distributed Graph-Based Convoy Control for Networked Intelligent Vehicles". IEEE Intelligent Vehicles Symposium (IV), (2015), 6 pages.
Ferrara, A., et al., "Sliding Mode Control for Automatic Driving of a Platoon of Vehicles". Proceedings of International Workshop on Variable Structure Systems, Jun. 5-7, 2006, pp. 262-267.
Wikipedia, "Vehicle Category". Wikipedia web article modified on Nov. 26, 2015, available at: https://en.wikipedia.org/w/index.php?title=Vehicle_category&oldid=692517112, 6 pages.
Sae, "Taxonomy and Definitions for Terms Related to On-Road Motor Vehicle Automated Driving Systems". Standard J3016, issued Jan. 16, 2014 (Jan. 16, 2014) Society of Automotive Engineers, 12 pages.
Wiki, "TMC/Event Code List". Wiki web article dated Jan. 16, 2014, available at: https://wiki.openstreetmap.org/w/index.php?title=TMC/Event_Code_List&oldid=981793, 79 pages.
Cottingham, D., "What Is A Vehicle Platoon?". Driver Knowledge Test web article, Jan. 29, 2014, 4 pages.

\* cited by examiner

SYSTEM AND METHOD FOR ROUTING AND REORGANIZATION OF A VEHICLE PLATOON IN A SMART CITY

CROSS-REFERENCE TO RELATED APPLICATIONS

The present application is a national stage application under 35 U.S.C. 371 of International Application No. PCT/US2017/064851, entitled SYSTEM AND METHOD FOR ROUTING AND REORGANIZATION OF A VEHICLE PLATOON IN A SMART CITY, filed on Dec. 6, 2017, which claims benefit under 35 U.S.C. § 119(e) from U.S. Provisional Patent Application Ser. No. 62/431,736, entitled "System and Method for Routing and Reorganization of a Vehicle Platoon in a Smart City," filed Dec. 8, 2016, the entirety of which is incorporated herein by reference.

BACKGROUND

A vehicle platoon is a group of vehicles that travels in close proximity to one another. Platooning may be one of the first automated vehicle technologies, especially for automation of commercial heavy goods vehicles. However, the development of platooning has been mainly focused on the highway environment.

Platooning, sometimes referred to as road trains, is a concept in which multiple vehicles travel in a group with synchronized driving dynamics through a Vehicular Ad-Hoc Network (VANET). Vehicles driving in a platoon communicate constantly and synchronize with each other. By use of platooning, the distances between vehicles may be reduced, overall fuel consumption may be lowered, and the number of drivers needed may be reduced.

ETSI and ISO have study items for platoon organization. 3GPP is considering semi- and fully automated platooning use cases. Autonet 2030 is working on convoying across non-uniform vehicle types.

In the next 5-10 years, platooning may be operated in limited automated modes, with limited drivers available to control a more-than-one vehicle platoon if needed. With NHTSA Level 3 automation, a driver is expected to be available to take full control when needed within comfortable transition time (e.g., 10 seconds). Splitting a platoon may cause undesirable results and may need to be planned in advance. The number of drivers for the platoon may need to be determined in advance.

Some publications relate to platoons in an urban environment, and some of these references discuss how platoons may interact with traffic signals. A journal article with a simulation study argued that saturation flow rates and intersection capacity in urban areas may be doubled or tripled by platooning vehicles with no change in signal controls at the intersections. Jennie Lions, et al., *Platoons of Connected Vehicles Can Double Throughput in Urban Roads*, CORNELL UNIVERSITY LIBRARY (Nov. 3, 2015).

An IEEE paper discusses how a platoon of autonomous vehicles can change formations in order to keep human-driven vehicles that lack V2V communications from interfering with the platoon. Guo Chunzhao, et al., *Self-Defensive Coordinated Maneuvering of an Intelligent Vehicle Platoon in Mixed Traffic*, 2012 15TH INTERNATIONAL IEEE CONFERENCE ON INTELLIGENT TRANSPORTATION SYSTEMS (ITSC) (2012).

The COMPANION project developed a process that matches trucks with overlapping routes together to platoons and adapts their speed profiles to meet on a highway during a transport. Sönke Eilers, Sergej Saibel, and Samuel Wickström, Cooperative Dynamic Formation of Platoons for Safe and Energy-Optimized Goods Transportation, D3.2: Information Model for Platoon Services, COMPANION, page 17.

The AutoNet2030 project has studied formation control of multi-lane vehicular convoys in highways where networked intelligent vehicles may join or leave the formation dynamically. Ali Marjovi, et al., Distributed Graph-Based Convoy Control for Networked Intelligent Vehicles, 2015 IEEE INTELLIGENT VEHICLES SYMPOSIUM (IV) (2015). The AutoNet2030 project has also specified inter-vehicle communications for a convoy driving service that enables cooperative vehicles to make automated adjustments of speed, heading, and lane usage according to a decentralized mechanism. Laurens Hobert, ed., *Specifications for the Enhancement to Existing LDM and Cooperative Communication Protocol Standards*, AUTONET 2030 (Feb. 6, 2015).

A paper of A. Ferrara and C. Vecchio describes a study of the use of cruise control in urban areas where pedestrians or other vulnerable road users (VRUs) may be present. Increasing pedestrians' safety may be attained by providing a control system of platoon vehicles with a collision avoidance capability. A. Ferrara and C. Vecchio, *Sliding Mode Control for Automatic Driving of a Platoon of Vehicles*, VSS'06 INTERNATIONAL WORKSHOP ON VARIABLE STRUCTURE SYSTEMS (2006).

U.S. Patent Application 2014/0210645 relates to optimizing automobile traffic flow through an intersection by detecting and reducing platoon interference. One method determines a cluster in traffic information of a cycle of a traffic signal, determines that the cluster qualifies as an upstream platoon, calculates properties of the platoon, and generates an Enhanced Purdue Coordination Diagram (EPCD) for the cycle based on the calculated properties of the platoon. Another method calculates a traffic signal timing change to improve traffic flow through an intersection based on platoon properties corresponding to each cycle of the intersection's traffic signal.

PCT Patent Application WO20100103504 relates to coordinating traffic at an intersection by adjusting the speed of platoon vehicles a predetermined distance from an intersection based on the adjusted velocity and platoon vehicle length, where the platoon vehicle length goes through an affine transformation of translation and scaling when crossing the predetermined distance due to the velocity adjustment. Additionally, a method and system for coordination between intersections are provided.

U.S. Patent Application 2016/0019782 relates to a method for increasing road safety in vehicle platoons, including presenting to vehicles not part of the vehicle platoon, based on information determined by the vehicle platoon, information intended to increase road safety.

U.S. Patent Application 2008/0134955 relates to improving highway safety by use of indicators, such as flags, magnetic signs, projected images, illuminated signs, window decals, or beacons, that show the existence of a convoy of vehicles and the position of a vehicle in the convoy.

U.S. Pat. No. 8,352,111 relates to a platoon leader vehicle controlling a platoon of vehicles by monitoring the position of non-leader vehicles, determining distances to operate the non-leader vehicles based upon the respective actual positions, and selecting a respective commanded vehicle position including a respective global positioning coordinate for each of the plurality of vehicles based upon the determined distances.

PCT Patent Application WO2014139821 relates to controlling a semi-autonomous vehicle by aggregating data from various sources to position and orient the vehicle, assigning an autonomous driving value to different route segments, determining an optimal route by minimizing a distance between a start position and a destination position, maximizing the percent autonomous value assigned, and displaying the optimal route.

U.S. Patent Application 2016/0025505 relates to an apparatus for generating a global path for an autonomous vehicle, including a sensor module including one or more sensors installed in the vehicle, a traffic information receiver configured to receive traffic information through wireless communication, a path generator configured to generate one or more candidate paths based on the traffic information, a difficulty evaluator configured to evaluate a difficulty of driving in the one or more candidate paths in each section of the one or more candidate paths using recognition rates of the one or more sensors and the traffic information, and an autonomous driving path selector configured to finally select an autonomous driving path by evaluating the one or more candidate paths based on the evaluation of the difficulty of driving.

SUMMARY

Systems and methods described herein include methods for minimizing platoon interruption and platoon splitting while traveling through a smart city. Systems and methods described herein also may determine a route plan, including platoon organization while traveling in smart city.

Platoon route planning may determine a suitable route for the platoon based on platoon characteristics. A platoon formation planning module may determine an optimal formation (e.g., where to use one or two lanes) for the platoon along the route by maximizing efficiency (e.g., intersection throughput) and minimizing impact to other road users.

Embodiments described herein improve the ability of a vehicle platoon or convoy to travel through a city by utilizing a smart city system to find an optimal route, formation, and other driving instructions for a platoon. Using methods and systems described herein, a smart city may minimize negative effects of platoons to other road users, for example, by taking into account types and numbers of vehicles in a platoon, length of a platoon, and availability (via V2I for one embodiment) of roadside units to support a platoon. Systems and methods described here may determine a platoon's ability to reorganize.

One embodiment of systems and methods described herein select a route for a group of vehicles, comprising: identifying a plurality of available platoon configurations for the group of vehicles; determining a plurality of route options from a first location to a second location, each route option comprising a plurality of segments; determining, for each of the plurality of segments of the plurality of route options, whether the respective segment supports at least one of the identified platoon configurations; selecting, from among the plurality of route options, a route for which each segment of the selected route has been determined to support at least one of the identified platoon configurations; and communicating the selected route to at least one vehicle in the group of vehicles.

One embodiment further comprises selecting, for each segment along the selected route, a corresponding platoon configuration that is supported by that segment; and communicating the selected platoon configurations to the at least one vehicle in the group of vehicles. One embodiment for selecting the route comprises eliminating route options from the plurality of route options that contain at least one segment that does not support at least one platoon configuration of a group of vehicles; calculating a route score for each of the plurality of route options not eliminated; and selecting the route from the plurality of route options wherein the route score of the selected route is above a threshold.

Figure 1:
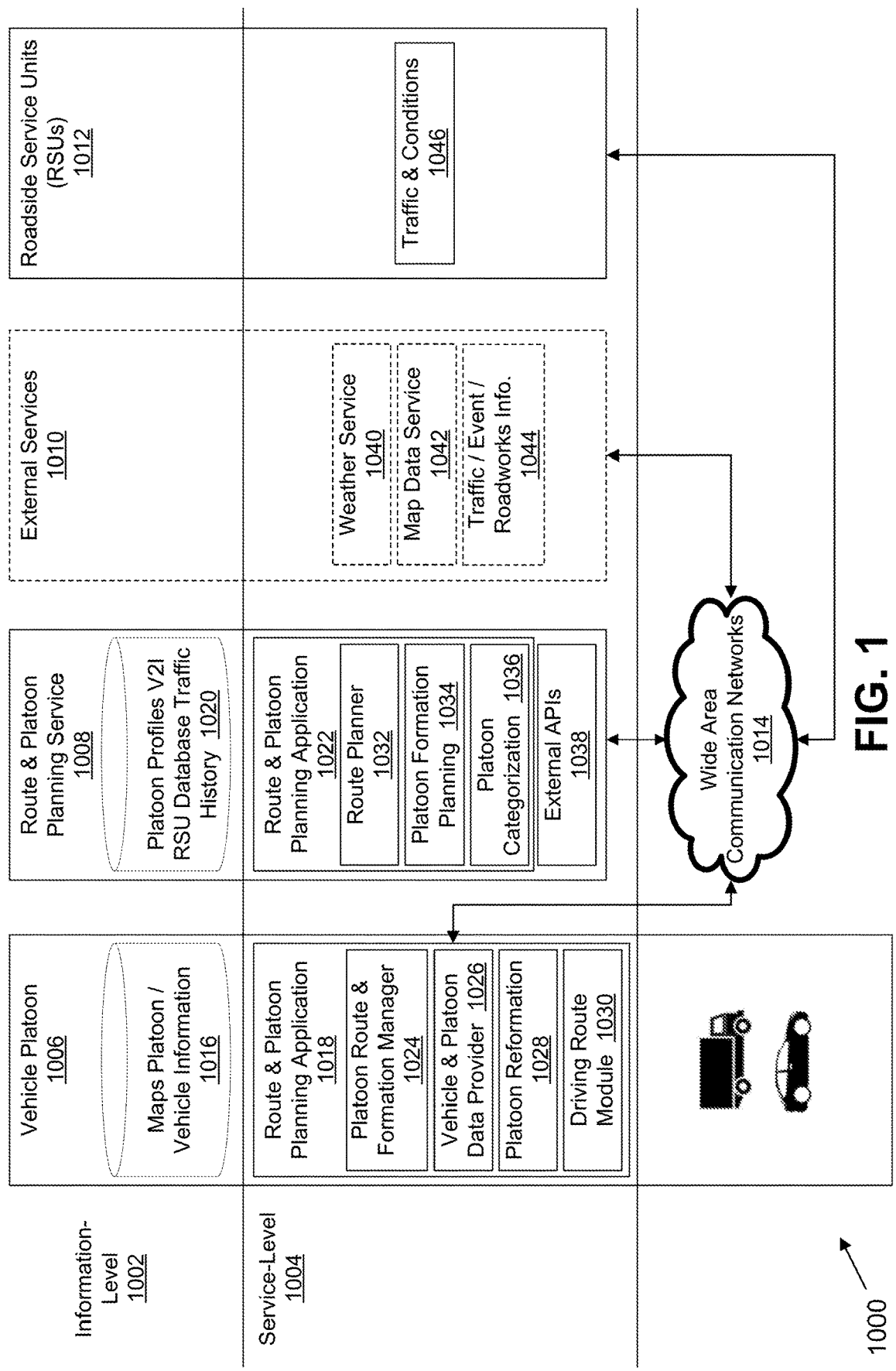
FIG. 1 is a system diagram showing communication interfaces for a vehicle platoon system.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." In this specification, the term "platoon" is used to cover both vehicle platoons that use only a single lane and vehicle convoys that may use several lanes.

DETAILED DESCRIPTION

Research shows that vehicle platoons of connected vehicles may double throughput in urban roads. Jennie Lioris, et al., *Platoons of Connected Vehicles Can Double*

Throughput in Urban Roads, CORNELL UNIVERSITY LIBRARY (Nov. 3, 2015). The present disclosure relates to systems and methods for directing platoons or convoys in an urban environment.

Currently, navigation systems calculate a route by minimizing fuel consumption, travelling time, or $CO_2$ emissions. Some navigation or routing methods for heavy goods vehicles or trucks may take into account vehicle weight or height limitations. There are also some predefined dedicated routes for dangerous goods transport in urban areas. Routes selected by these navigation or routing systems are not based on vehicle platoons.

Systems may generate a route of global path for an autonomous vehicle to maximize the fully automated or autonomous driving. However, these systems make decisions based only on a single vehicle and do not based on a platoon of vehicles or various vehicle types. Existing navigation systems are not designed for optimizing a route or formation of a vehicle platoon in an urban environment. Moreover, the routing based on static information (such as fixed routing of a dangerous goods transport through a city) may not be the most optimal one, and a smart city may provide various up-to-date data and services to support platoons. Platoons and convoys, which may utilize several lanes, may be used in urban an environment to make traffic more efficient. Smart cities may provide support and guide these platoons and convoys in optimized routes and formation. Splitting a platoon is undesirable and may need to be determined in advance. The number of drivers in a platoon used in a platoon may be calculated in advance. Systems and methods described herein provide ways to improve planning of a vehicle platoon route and to determine where to reorganize a platoon vehicle in a smart city.

Systems and methods described herein may include for some embodiments several advantages, such as a platoon may determine an optimal route and formation within a smart city. Before executing a plan, a platoon may determine where to reorganize (such as changing from a one-lane to a two-lane configuration) while diving through a city to maximize throughput in signalized intersections. Systems and methods described herein may interface with a smart city to minimize negative effects of a platoon on a city or other road users. Traffic safety and efficiency may be increased in embodiments where a smart city is able to dynamically control where, when, and what types of platoons traverse (or travel) through a city. Platoons may be routed based on a category (such as vehicle type, number of vehicles, and platoon length). For example, vehicle platoons (especially platoons containing heavy vehicles) may not be allowed in city areas if there are lots of pedestrians or other vulnerable road users (VRUs). Light city vehicle platoons with small numbers of vehicles may be used more widely. Also, investments in roadside units, which may be used to support platoons, may be maximized if platoons are routed through these intersections.

FIG. 1 is a system-level diagram 1000 showing a general architecture of a vehicle platoon 1006, routing & platoon planning service 1008, external services 1010, and RSUs 1012. The diagram 1000 is divided into information-level elements 1002, service-level elements 1004, and communication elements. A vehicle platoon 1006 may use a service to determine a route and platoon instruction. A vehicle leading a platoon may have a primary terminal (such as an in-vehicle terminal) linked with a route and platoon planning service (RPPS). A vehicle platoon 1006 may use a route and platoon planning (RPP) application 1018, a digital map database of platoon and vehicle information data 1016, and wide-area wireless communications 1014 (such as cellular systems). A route and platoon planning application 1018 may include a platoon route and formation manager module 1024, a vehicle and platoon data/information provider module 1026, a platoon reformation module 1028, and a driving route module 1030. A platoon route and formation manager module 1024 may send route requests to a smart city RPPS 1008. A vehicle and platoon data/information provider 1026 may communicate information about vehicles in a platoon, such as vehicle types (such as truck, bus, passenger van, car, or light city vehicle) and automation level of vehicle. A platoon reformation module 1028 may execute a platoon reformation plan along a route communicated by an RPPS 1008. A driving route module 1030 may execute a driving plan along a route communicated by an RPPS 1008.

A route and platoon planning service (RPPS) 1008 running as a smart city cloud service may contain information storage 1020 and a route and platoon planning application 1022. Information storage 1020 may contain platoon profiles, a vehicle to infrastructure (V2I) RSU database, and traffic history data. Platoon profiles may include predefined categorizations of platoons. A V2I RSU database may contain current locations of roadside units 1012 capable of V2I communications with a platoon. Traffic history data may include history data about the impacts of platoons in a city area, such as how different size platoons affect intersection traffic.

A route and platoon planning application 1022 running on an RPPS 1008 may determine platoon routes in a smart city using some of the following modules: a route planning module 1032, a platoon formation planning module 1034, a platoon categorization and route limitation module 1036, and a communication module 1038 for interfacing with external APIs and external services 1010. A route planning module 1032 may determine a platoon route based on platoon category, restrictions on travel areas for platoons (for example, near schools), current traffic conditions in a city, event information, weather, time of day, and locations of V2I roadside units. A platoon formation planning module 1034 may determine optimal platoon formation (such as where to use one or two lanes) to maximize efficiency (for example, intersection throughput) and to minimize impact to other road users. A platoon categorization and route limitation module 1036 may classify a platoon using predefined categories according to platoon vehicle types, platoon length, and ability to organize a platoon in multiple lanes. This categorization may be used to determine which streets may be used by a platoon. A communication module 1038 may be used to interface with external services 1010, such as weather services 1040, map data services 1042, and traffic/event/roadwork information services 1044.

External services 1010 may include service-level modules 1004. These modules 1004 may include a weather service 1040, a map data service 1042, and traffic/event/roadwork information service 1044. A roadside unit (RSU) 1012 may be connected to an RPPS 1008 and execute a traffic and conditions module 1046. A traffic and conditions module 1046 may monitor traffic and conditions in the RSU location and may report to an RPPS 1008. A vehicle platoon 1006, a route & platoon planning service 1008, external services 1010, and RSUs 1012 may communicate with each other using a wide area communication network 1014, such a cellular system.

Figure 2:
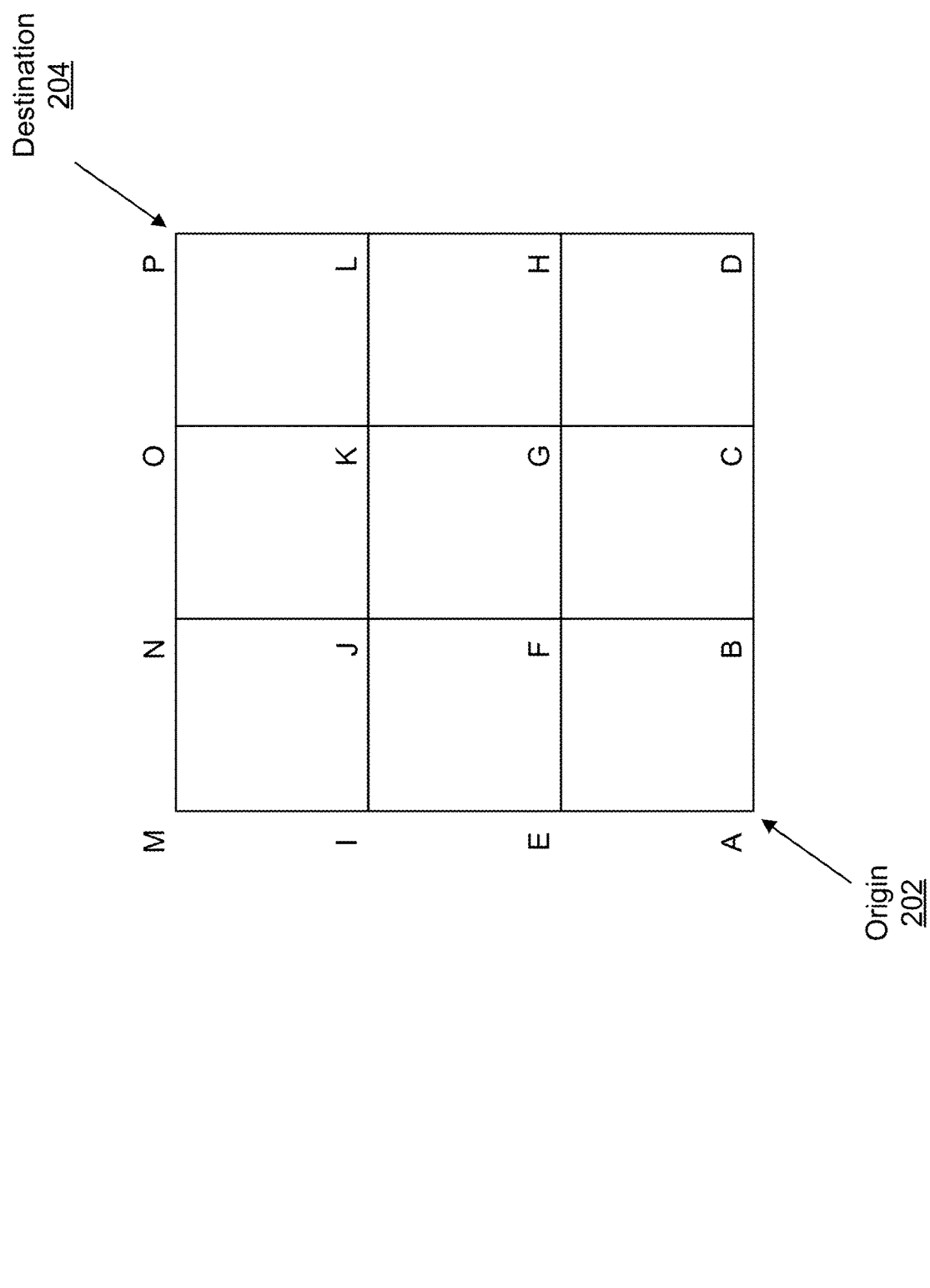
FIG. 2 is an example schematic plan view illustrating segments (streets) that connect nodes (intersections) between an origin and a destination.

FIG. 2 is a map layout 200 of streets in a grid configuration that may be used to go from an origin 202 to a destination 204. A platoon categorization and route limitation process may be used by a platoon to request a route and driving instructions from a smart city device. A platoon categorization and route limitation process may use the number of vehicles in a platoon, the length of a platoon, as well as the types of vehicles in determining route options to go from an origin to a destination. For example, a platoon may include only light 3-wheeler city vehicles, which may arrange themselves in multiple lanes to make a platoon shorter. A 2-lane platoon may be routed more freely in a city than a single-lane platoon of many heavy trucks. Routing may minimize the impact which a platoon may cause to other road users. For example, routing may minimize driving through complex crossings or stop-sign crossings.

Determining routing may also minimize safety hazards by avoiding crossings or street sections with lots of pedestrians or other VRUs, such as schools or nurseries during day and areas with active road construction (or road work). A smart city may have areas where certain kinds of vehicle platoons are not allowed. A smart city platoon categorization and route limitation component takes these issues into account before calculating an actual route.

A platoon categorization may be determined according to the number of vehicles, length of the vehicles, gap between vehicles, and the formations in which a platoon may travel. The minimum platoon length supported for each formation may be calculated. For example, a platoon formation may be one lane (of eight vehicles), two lanes (of four vehicles each), or three lanes (two lanes of three vehicles plus one lane of two vehicles). For this example, the platoon may be reorganized to one or multiple lanes. The platoon may be driving toward a city area in a two-lane formation. The platoon length, for example, may be 55 meters for a one-lane configuration and 30 meters for a two-lane formation. A route determination process may determine which streets in a city allow the platoon. FIG. 2 shows a street map for a smart city, where each segment (street) between nodes (intersections) may be named based on the end-nodes. Each segment (and the end-nodes) has a maximum platoon length (where one- and two-lane formations may have different values).

Table 1 is an example table of platoon size segment limits for an example configuration. These limits may be set by a smart city. Table 1 is based on the street map shown in FIG. 2. Table 1 is an example, and this table does not include all segments shown in FIG. 2. For this example, segments that prohibit platoons (such as near a school during school days) are marked with a maximum length of zero. A smart city device may change maximum length values dynamically, such as for daytime and night-time periods, special events, or construction (road work). The last row in Table 1 (the A-B-C-D-H-L-P segment) lists a road that goes around the city to avoid going through the city, where all platoons are permitted to traverse (or travel). This row in the table may be used to avoid a situation where no route is available.

TABLE 1

Platoon Size Segment Limits for an Example Configuration

| Segment | Maximum Length | | Supported Platoon Configuration |
|---|---|---|---|
|  | One Lane (meters) | Two Lane (meters) |  |
| A to E | 70 | 0 | 1 |
| E to F | 60 | 0 | 1 |
| F to G | 40 | 40 | 1 or 2 |
| G to K | 40 | 40 | 1 or 2 |
| K to L | 40 | 40 | 1 or 2 |
| K to O | 50 | 0 | 1 |
| B to F, C to G, G to H | 40 | 0 | 1 |
| All Segments Between I, J, N, and M | 0 | 0 | 0 |
| A to B to C to D to H to L to P (Available for All Platoons) | 1000 | 1000 | 1 or 2 |

Figure 3:
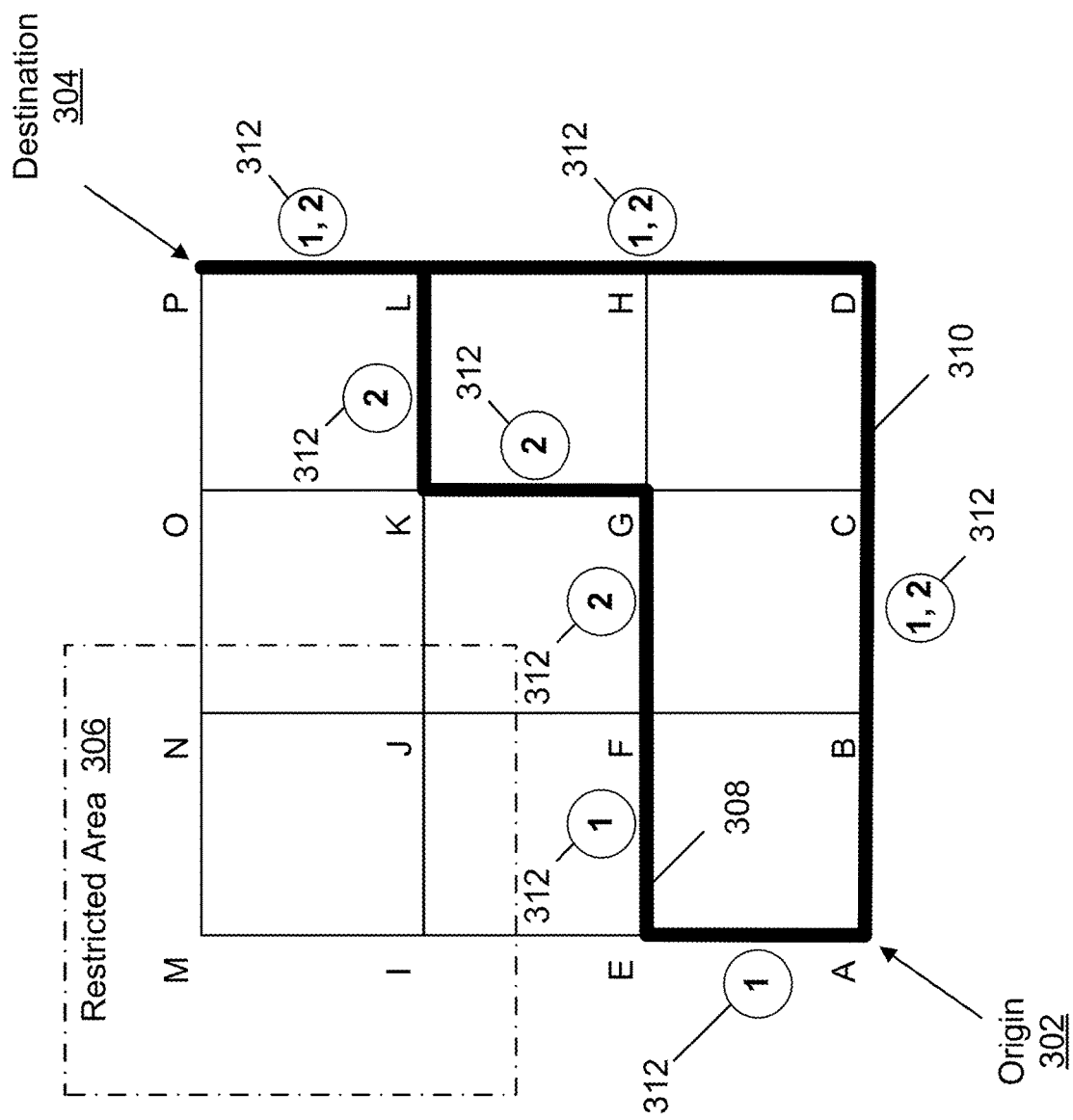
FIG. 3 is an example schematic plan view illustrating available routes that support an example platoon configuration.

FIG. 3 shows a map 300 of available links for an example platoon to traverse (or travel) through a city, where the limitations shown in Table 1 are applied to the street map of FIG. 2. For this example, a platoon may have a one-lane length of 55 meters and a two-lane length of 30 meters. Available segments 308, 310 are shown with thick line in FIG. 3. The restricted area 306 for the I-J-N-M segments is marked with dashed lines. The segment K-O is not available for the platoon due to the one-lane length limitation (the two-lane formation is not available). FIG. 3 also shows as bold lines segments 308, 310 where the example platoon may use only one configuration (either a 1- or 2-lane configuration). The bold line segments 308, 310 are communicated to a routing engine. A route calculation (with traffic, roadwork, and weather) for the platoon may be performed using only the allowed segments (streets). Route selection uses crossings equipped with V2I roadside units, which may be used to communicate with platoons. These roadside units may transmit priority signal timing and receive from platoons priority requests for traffic lights. These systems may be used to avoid splitting of a platoon at a traffic light. Route calculations may determine, for example, a set of candidate (fastest) routes.

FIG. 3 shows in bold two routes 308, 310 that may be used by an example platoon to traverse (or travel) from the origin 302 to the destination 304. Supported platoon configurations 312 for an associated segment of the two routes 308, 310 are shown inside a circle. A minimum platoon length may be calculated by adding up the length of the vehicles and further adding an inter-vehicle distances to the total minimum length. The inter-vehicle distance may depend on one or more parameters such as vehicle type, platoon speed, and road conditions. For example, an inter-vehicle distance may have a greater value in front of a larger vehicle and may also have a greater value when road conditions are poor.

Figure 4:
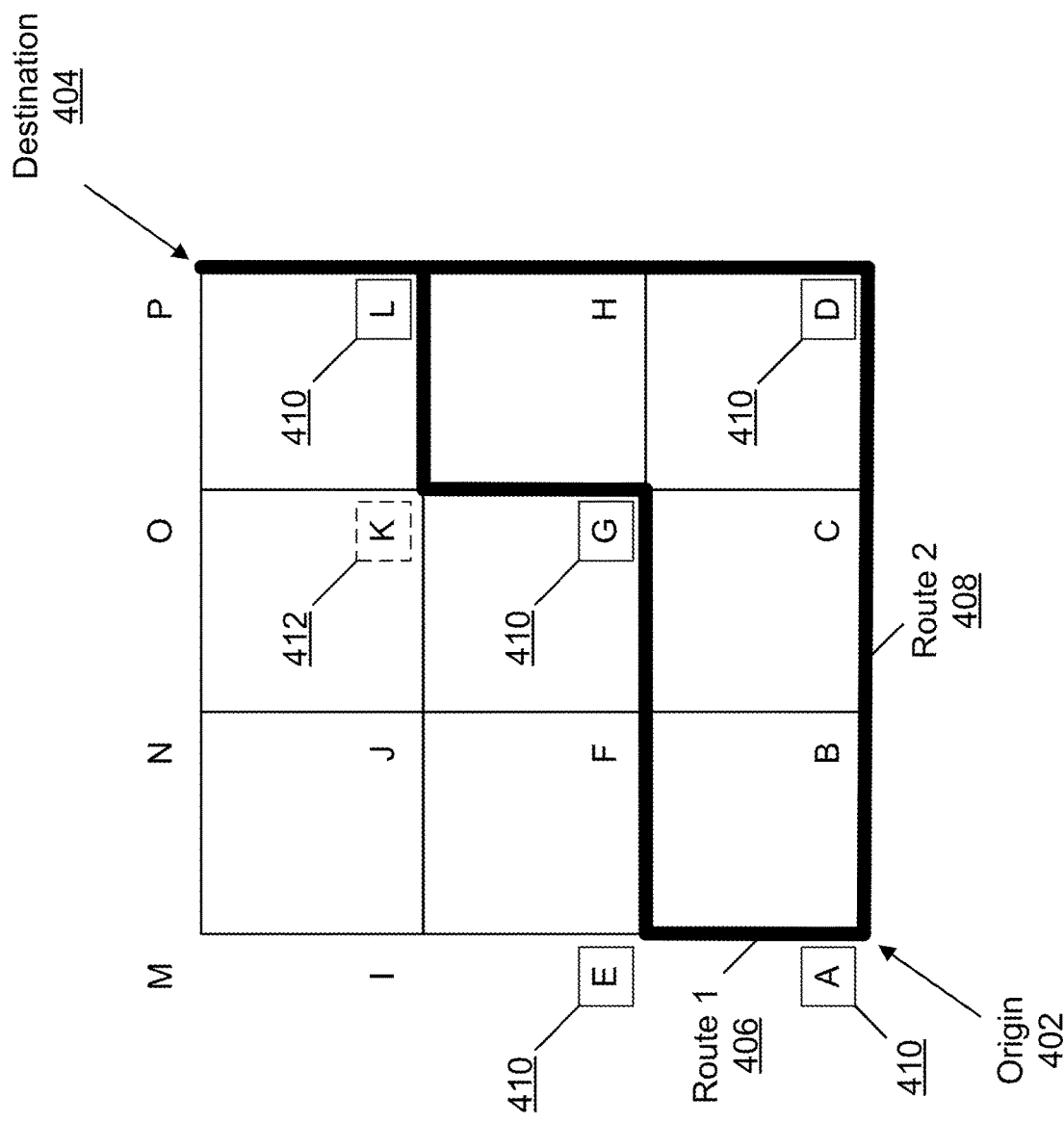
FIG. 4 is an example schematic plan view illustrating candidate routes with traffic lights and roadside units (RSUs) shown for each candidate route.

FIG. 4 is an example diagram 400 of candidate routes with traffic lights and RSUs shown for each candidate route 406, 408 to go from an origin 402 to a destination 404. Route configuration data for each candidate route 406, 408 is communicated to a platoon management module, which may include the number of traffic lights with and without RSUs are on a route as well as which RSUs are able to support a platoon formation/configuration on a route (such as configuring a traffic light to have a delayed green). For each candidate route 406, 408 in FIG. 4, nodes (intersections) with traffic lights containing an RSU are shown as a solid line square 410 around the node letter. Nodes with traffic lights lacking an RSU are shown as dashed lines 412 around the node letter. Nodes without a traffic light have no additional markings. For some embodiments, several routes may be communicated to a platoon with information about length and estimated time of a route as well as number of operational RSUs on a route.

Figure 5:
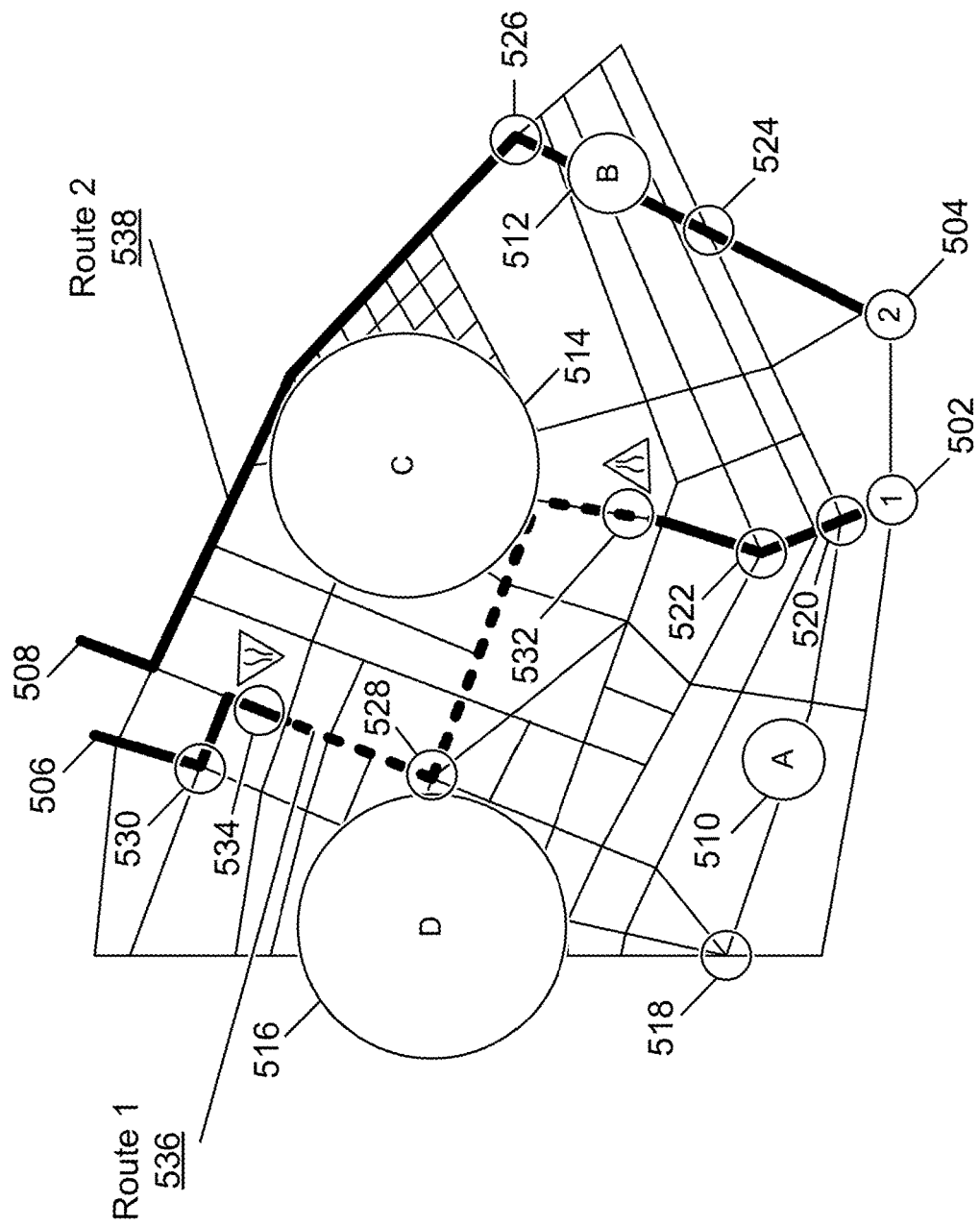
FIG. 5 is an example schematic plan view illustrating two candidate routes on a street map with RSUs, traffic lights, and construction areas displayed.

FIG. 5 is an example street map 500 showing two candidate routes, along with RSUs, traffic lights, and construction areas. Based on an intersection layout on a planned route, a smart city may make a preliminary plan for how a platoon may be organized (e.g., using 1 or 2 lanes) before each crossing to make the platoon shorter and traverse (or travel) more efficiently through smart city. A smart city may also determine where a platoon reorganization may be done based in part on current traffic conditions.

For the example shown in FIG. 5, there are several events in the city which the platoon may avoid, which influences platoon routing. There is a concert in a park (A) 510 and there are a lot of pedestrians, cyclists and other VRUs. At location B 512, there is slow traffic due to construction (roadwork). There are also 2 areas in the city where platoons with heavy vehicles are not allowed. An area where there are many schools, nurseries and a hospital (C) 514 is a restricted area for heavy vehicle platoons during day time. In the downtown area (city center) (location D 516), platoons with heavy vehicles are prohibited. Some or all of these factors may be used in calculating a route.

For this example, a routing service has determined two candidate routes through a city. Route 1 (536) starts at the circle with a "1" inside the circle 502 and continues to an exit of the city 506. Route 1 (536) includes reorganization of the platoon. Route 1's solid line indicates a route section where the platoon may use 2 lanes, and the dashed line indicates a route section where the platoon may use only one lane. The location to reorganize the platoon to a single lane 532 is indicated with a "narrow street" traffic sign and reorganization location to multiple lanes 534 is indicated with a "narrow street" upside-down. There are 4 roadside units (RSUs) 520, 522, 528, 530 on the route which communicate that there are no traffic incidents and that the RSUs may communicate other support messages for the platoon. For this example, route 1 (536) is the fastest route.

Route 2 (538) starts at the circle with a "2" inside the circle 504 and continues to an exit of the city 508. Route 2 (538) goes through a slow traffic area (location B), and route 2 (538) is not as fast as route 1 (536). Route 2 (538) may be driven without any reorganization of the platoon. For some embodiments, a platoon leader vehicle may choose which route to take. Route 2 (538) includes two RSUs 524, 526 on the route which communicate that there are no traffic incidents and that the RSUs may communicate other support messages for the platoon. Additionally, there is an RSU 518 not part of route 1 (536) or route 2 (538).

Figure 6:
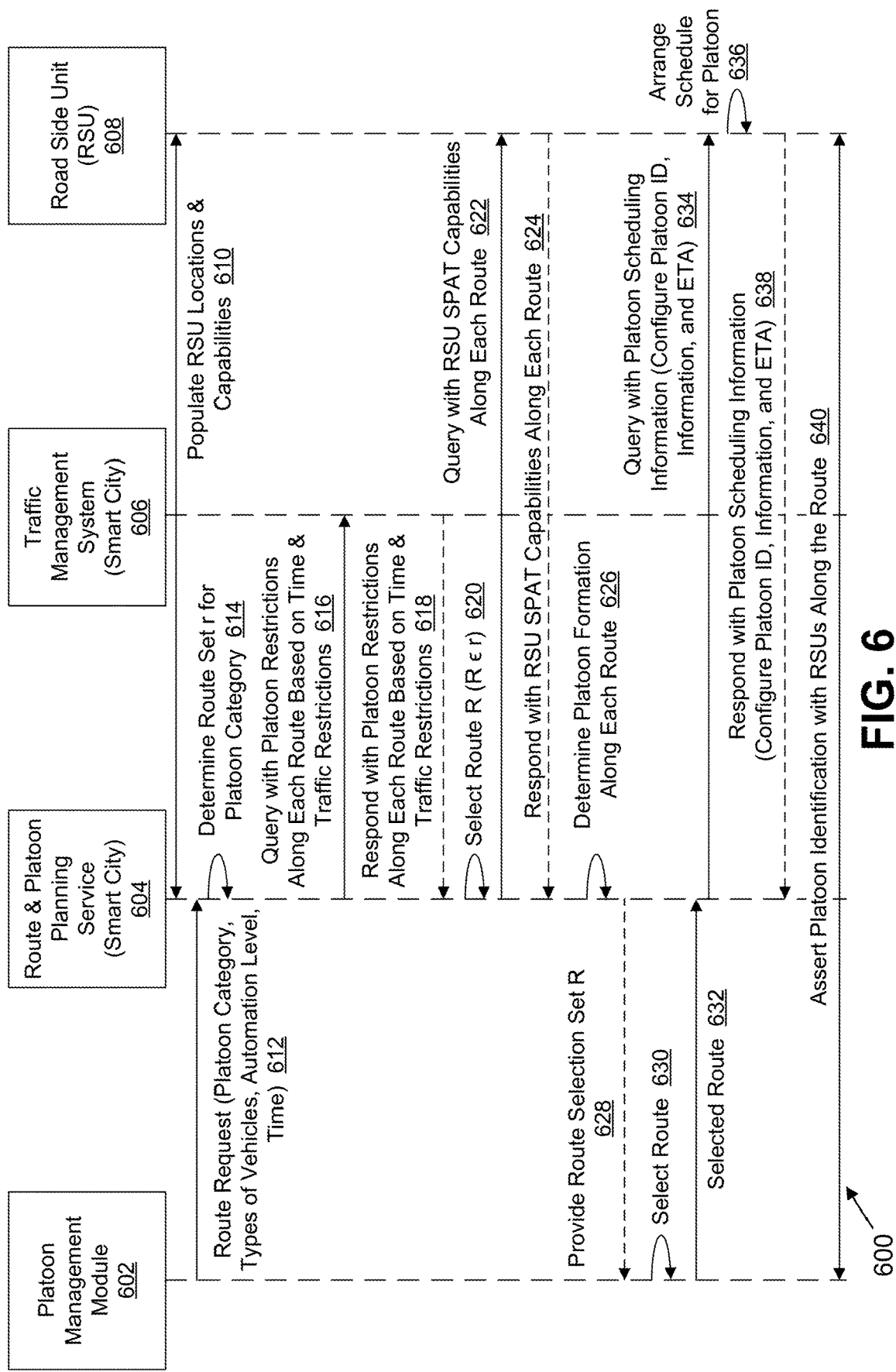
FIG. 6 is a message sequence diagram for communications between a platoon management module, a platoon route planning service, a smart city traffic management system, and an RSU in selecting a platoon route.

FIG. 6 is message sequence diagram 600 for a process of determining which route to take through a smart city. For many embodiments, this process has several features. For FIG. 6, the platoon is already set up and is about to start or is already driving towards the destination. Also, for this example, the platoon has a leading vehicle or a convoy (which may not have a leading vehicle) has selected one vehicle to handle communication with a smart city. For this example, the leading vehicle has the route and platoon planning application installed and connected to a smart city RPPS. Also, the platoon is already arranged in an initial configuration, and the leading vehicle has stored in memory detailed information of platoon vehicles and platoon capabilities, such as information as to whether the platoon is able to reorganize from one lane to multiple lanes. Platoon management software or a leading vehicle operator starts the RPP application running, which may occur in response to the platoon planning a route, in response the platoon is starting to travel, the platoon being in the vicinity of the city, or in response to the platoon entering the city, among other options.

As part of the process of selecting and traversing (or traveling) a route, a smart city route and platoon planning service (RPPS) 604 updates 610 with the locations of RSUs 608 along the route. The RSUs 608 may be capable of sending messages to traffic lights to request longer green lights, for example. For some embodiments, RSUs 608 may be movable. A platoon requests a route and driving instructions from a smart city. A platoon category may be used to classify the platoon based on the number of vehicles, vehicle types, and length of the platoon. A Platoon Management Module 602 sends a Route Request 612 to an RPPS 604. For some embodiments, a Route Request 612 may include a platoon category, types of vehicles, automation level, and route time window. A set of candidate routes for the platoon may be calculated 614 based on a fastest route calculation using the street network available for the platoon. A Smart City's RPPS 604 may query 616 and receive 618 current platoon route restrictions (or limitations) from (external) a traffic management system 606 based on traffic, events, roadwork (construction), and weather data. For some embodiments, an RPPS 604 may send a traffic condition requests to RSUs 604 along a candidate route. An RSU 608 may respond with a status report that may include traffic condition information at an RSU location. Information may also include current traffic volumes, the number of pedestrians in the vicinity, other VRUs, the status of RSU support for platoons, and road alerts (e.g., a lane blocked). Based on the location of traffic lights (with and without RSU support) on the routes and, optionally, up-to-date information from RSUs, a route is selected 620 from a list of candidate routes. For some embodiments, several candidate routes may be communicated to a platoon leader vehicle to choose a route. For some embodiments, a selected route is communicated from a platoon management module 602 to an RPPS 604.

An RPPS 604 may send an RSU signal phase and timing (SPAT) Capabilities Query message 622 to an RSU. The RSU 608 may respond with RSU capabilities for the candidate route 624. The candidate route may include the driving direction through each intersection with an RSU (e.g., straight, turn right or left). An RSU SPAT capabilities reply message 624 from an RSU 608 may include RSU location, RSU status and capabilities, and candidate platoon formations. The RSU location field may include coordinates of an RSU. The RSU status and capabilities field may include current condition of an RSU (e.g., all systems running normal, or a list of systems not working properly), whether an RSU is able to support a platoon via V2I communications and an ability to communicate a priority request message to a traffic light for a longer green light. The candidate platoon formations field may include which formations (such as one- or two-lane) a platoon may use if traveling through an intersection in a planned driving direction.

For some embodiments, the RPPS 604 may determine 626 an optimal formation based on intersection layouts of the planned route, RSU information, and locations where platoon reorganization may be done in the route. For example, a platoon may reorganize (e.g., use 1 or 2 lanes) before each crossing in order to travel efficiently through a smart city and to adjust a platoon's configuration based on current traffic conditions. The RPPS 604 communicates 628 the route(s) and formation plan to the platoon module 602. For each route option (R∈r), a platoon formation along component route segments, a time window in which a formation is valid, and identification of associated RSUs may be sent 628 from an RPPS 604 to a platoon management module 602.

For some embodiments, the route(s) are chosen 630 by the platoon leader vehicle (which may occur via a platoon management module 602) and communicated 632 to an RPPS 604. An RPPS 604 sends a Platoon ETA Query message 634 to an RSU 608, which may send a Platoon ETA Response message 638. Platoon ETA Query and Response messages 634, 638 may include a platoon ID, a planned platoon formation (configuration) and estimated time of arrival for each RSU along the route(s). Platoon ETA Query and Response messages 634, 638 may include a platoon identification (ID), a planned platoon formation (configuration), and an estimated time of arrival at each RSU along a route. The RSU 608 may arrange scheduling for a platoon 636. An RSU 608 may determine traffic light timing for the platoon and may send a request to a traffic light for an extended green light, for example. Platoon Identification Assertion messages 640 may be sent to RSU along a route.

Figure 7:
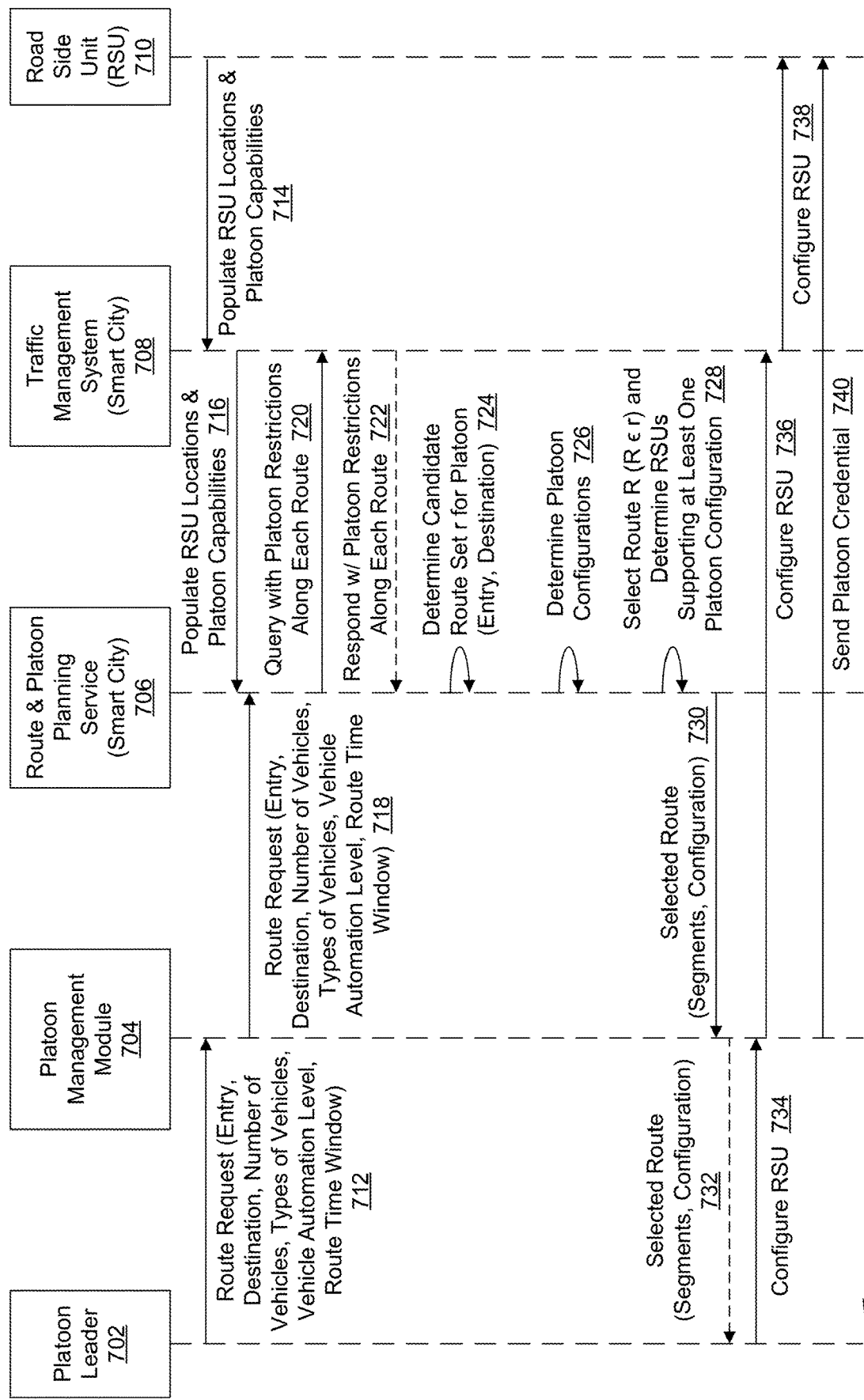
FIG. 7 is a message sequence diagram for another embodiment of communications among a platoon leader vehicle, a platoon management module, a platoon route planning service, a smart city traffic management system, and an RSU in selecting a platoon route.

FIG. 7 is a message sequence diagram 700 for another embodiment of a process of determining which route to take through a smart city. A Platoon Leader 702 vehicle sends a Route Request 712 to a Platoon Management Module 704, which forwards the Route Request message 718 to the RPPS 706. For some embodiments, a Route Request 712 may include origin (entry), destination, number of vehicles, types of vehicles, vehicle automation level, and route time window. For other embodiments, a Route Request 712 may also include a current platoon location, heading, destination, information about the platoon and vehicles, and platoon category. A platoon location field may include latitude and longitude coordinates of the lead vehicle. A heading field may include direction of travel of the lead vehicle. The destination field may include destination of the platoon (and the leading vehicle) and may be used in a route calculation. Some vehicles may leave a platoon before reaching the destination. The number of vehicles field is the number of vehicles in the platoon. If there are several types of vehicles, the total number of vehicles may be provided along with a list of the number of vehicles for each vehicle type. The vehicle type and vehicle automation level fields are discussed below with regard to Tables 2 and 3. For example, an automation level equal to level 2 has partial automation and human driver monitoring, while a mode equal to level 4 has a high level of automation. The platoon driving mode field contains the driving mode of the platoon (leading vehicle). The platoon reorganization field is TRUE or FALSE depending on if the platoon is able to reorganize from one lane to multiple lanes or vice versa. The platoon length field may contain the length (in meters) of the platoon in single lane formation. If a platoon supports multiple lane formations, the platoon length field also may contain the length of the platoon in each multiple lane formation (such as the length in 2-lane formation and the length in 3-lane formation).

For an RSU locations and capabilities message 714 sent from an RSU 710 to a traffic management system 708 and forwarded 716 to an RPPS 706, RSU location fields may include latitude and longitude coordinates of an RSU. Such a message 714, 716 may also include platoon capabilities supported by an RSU.

An RPPS 706 determines 724 a set of candidate routes for the platoon. For some embodiments, this determination 724 is based on route restrictions queried 720 by an RPPS 706 and responded 722 by a traffic management system 708. For some embodiments, the RPPS 706 determines 724 which route to use from the set of candidate routes. For one embodiment, an RPPS 706 may determine 726 which platoon configurations to use. Also, the RPPS 706 may determine 728 which RSUs 710 support at least one platoon configuration. A selected route may be communicated 730 from an RPPS 706 to a platoon management module 704. For one embodiment, the selected route may be communicated 730 with a set of waypoints (e.g., intersections), along with a list of RSUs that may provide support. For some embodiments, several routes may be provided 732 optionally for a platoon (or platoon leader vehicle 702) to choose. A list of alerts related to the selected route may be communicated to the platform management module 704. An RPPS 706 may also communicate formation instructions for the platoon to drive and locations where a platoon may reorganize (if needed). Instructions may be communicated for each segment in the route, including information for the platoon, such as recommended speed, gap between vehicles, recommended platoon formation through intersections (one lane or multiple lanes).

For some embodiments, an RPPS 706 may send a request to a traffic management system or external service for a status report of traffic conditions. The request message may include RSU location, RSU status and capabilities, vehicle traffic volumes, the number of local pedestrians, the number of VRUs, and route alerts. The RSU location field may include the coordinates of an RSU. The RSS status and capabilities field may include the current condition of the RSU, RSU capabilities, and RSU platoon support. The current condition of the RSU may include values representing the state where all RSU systems are working or values corresponding to the systems not working properly. RSU capabilities may include detection of vehicle traffic, pedestrians, and VRUs. RSU platoon support may include V2I communications and the ability to communicate priority signal timing messages to traffic signals to request a longer green light. The vehicle traffic volumes field may include current traffic volumes at the RSU location. The number of pedestrians may include volume of pedestrian traffic near the RSU. The number of VRUs is the number of VRUs detected near the RSU. The alerts field in the number of detected alerts, such as whether a lane is blocked and the time such an alarm condition occurred. The alerts field may be codes using, for example, the event codes employed in the Traffic Message Channel (TMC) system or analogous codes.

For one embodiment, a Platoon Leader 702 may configure an RSU 734. A Platoon Management module 704 may send an RSU Configuration message 736 to a Traffic Management System 708, which is forwarded 738 to an RSU 710. Platoon Credentials may be sent 740 from a Platoon Management module 704 to an RSU 710.

Tables 2 and 3 are example tables for using vehicle category and level of automation in determining a platoon route. Platoon categorization may be performed based on the following example. A smart city may assign different values to vehicle categories for use in calculating a vehicle score. A smart city may use this method to limit the number of heavy vehicles in the city or a portion of the city. Table 2 lists an example vehicle category scoring table. For some embodiments, a smart city control system or device may change dynamically vehicle category scoring values.

TABLE 2

Example Vehicle Score for Multiple Configuration Options

|  | Vehicle Category | | | | |
|---|---|---|---|---|---|
|  | L (Light) | M1 (Passenger Car) | M2 to M3 (Bus) | N1 to N2 (Truck) | N3 (With or Without Trailer) |
| Vehicle Score (Points) | 1 | 4 | 6 | 8 | 10 |

Table 3 lists an example automation level scoring table. For some embodiments, scores may be calculated for each vehicle in the platoon and added together. Vehicle score and automation score may be added together to calculate a total platoon category score.

TABLE 3

Example Automation Score for Multiple Configuration Options

| Automation Level | 0 to 1 | 2 | 3 | 4 | 5 |
|---|---|---|---|---|---|
| Automation Score (Points) | 5 | 4 | 3 | 2 | 1 |

For example, vehicle category and automation scores may be calculated for a platoon with three passenger cars with an automation level of 3 and two buses with an automation level of 4. The vehicle score of 24 may be calculated as 3 vehicles times 4 points per vehicle plus 2 vehicles times 6 points per vehicle. The automation score of 13 may be calculated as vehicles times 3 points per vehicle plus 2 vehicles times 2 points per vehicle. Adding the vehicle category and automation scores together calculates a total category score of 37 for this example. For this example, the platoon may be reorganized as one or multiple lanes. In an example, a platoon is driving towards the city area in a two-lane formation. The platoon length is 55 meters in a one-lane formation and 30 meters in a two-lane formation.

Table 4 is a table of example maximum category scores for street segments. A platoon category score may be used to determine which streets would allow the platoon. In FIG. 2, each segment (or street) (and the end-nodes) has a maximum platoon category score and maximum length (for one-lane and two-lane formations). Not all segments shown in FIG. 2 have an entry in Table 4 because Table 4 is simplified for explanation purposes. Platoons are not allowed on some segments (e.g., near school during school days), and these segments are marked with a zero score. A smart city system or device may change maximum category scores dynamically. For example, daytime and night may have different limits. Also, events with a lot of pedestrians or the presence of roadwork in a specific area may limit the use of some segments. The last row in the table shows a road around (or out of) the city area where all platoons may traverse (or travel). This route may be used to avoid a situation where no other route is available. Table 4 is different from Table 1 in that Table 4 lists maximum category scores, while Table 1 lists maximum platoon lengths. For the example platoon used with Tables 2 and 3, only segments where the maximum score is greater than 37 are available. For this example, the restricted area (segments I-J-N-M) may not be used by the platoon.

TABLE 4

Example Maximum Category Scores for Multiple Segments

| Segment | Maximum Category Score |
|---|---|
| A to E | 45 |
| E to F | 40 |
| F to G | 40 |
| G to K | 35 |
| K to L | 35 |
| K to O | 40 |
| B to F, C to G, G to H | 30 |
| All Segments Between I, J, N, and M | 0 |
| A to B to C to D to H to L to P (Available for All Platoons) | 1000 |

A route calculation limits the number of candidate routes, which are available for the platoon in the city. The route selection may use crossings equipped with V2I roadside units (RSUs), which may support platoons. These RSUs may communicate priority signal timing and platoon priority requests to traffic lights. This system or method may be used to avoid splitting a platoon at a traffic light.

Table 5 is an example table of node scores that may be used to calculate a total platoon driving score for a route. If a platoon approaches a smart city, candidate routes may be determined and ranked based on a current feedback report from RSUs and the number of traffic lights with and without RSUs on each route. The values shown in the table for Table 5 may be used with the two example routes shown in FIG. 4.

TABLE 5

Example Node Scores and Total Platoon Scores for Two Example Candidate Routes

| Route | Node Score | | | | | | Total Platoon Driving Score |
|---|---|---|---|---|---|---|---|
| 1 | A = 2 | E = 3 | F = 0 | G = 0 | K = −1 | L = 2 | P = 0 | 5 |
| 2 | A = 2 | B = 0 | C = 0 | D = 0 | H = 0 | L = 2 | P = 0 | 6 |

For some embodiments, the following method may be used to select a platoon route. Intersections with a right of way and without a traffic light have a ranking score of zero. For this example, nodes B, C, F, H, and P are in this category. Intersections without a right of way (such as no stop sign or no obligation to yield the right of way) and without a traffic light have a ranking score of −3. An intersection with traffic lights but without an RSU have a ranking score of −1. Node K is in this category. An intersection with traffic lights and with a right of way may have a ranking score set based on the latest status report from the RSU. If an RSU communicates a current condition of OK, the RSU has the ability to send signal timing to a traffic light as part of a platoon priority request, and the traffic is at a normal or minimal level, a ranking score of 2 may be used. If an RSU communicates a current condition of OK and the traffic is at a normal or minimal level, a ranking score of 0 is used; hence, an RSU in this situation lacks the ability to send priority requests to a traffic signal. If an RSU communicates a current condition of not OK, but the traffic is at a normal level, a ranking score of −1 is used. If vehicle traffic, the number of pedestrians, or the number of VRUs is high, a ranking score of −2 is used. If a traffic alert has been received regarding the intersection, a ranking score of −3 is used.

Ranking of each candidate route may be calculated for traversing (or traveling) through each node on a route. For example, some RSUs communicate good conditions and some RSUs lack the ability to send platoon priority signals to a traffic light. For the two routes shown in FIG. 4, the nodes scores shown in Table 4 may be used to calculate a total platoon driving score. Route 1 traverses (or travels) through nodes A, E, F, G, K, L, and P, while route 2 traverses (or travels) through nodes A, B, C, D, H, L, and P. Using the method outlined above, a total platoon driving score of 5 is calculated for route 1. For route 2, a total platoon driving score of 6 is calculated. For this example, route 2 has a higher total platoon driving score and is therefore is a preferred route. For some embodiments, several routes may be communicated to a platoon with information about route length, estimated driving time to traverse a route, and platoon driving scores for each route.

For other embodiments, the lead platoon vehicle may calculate platoon routes and determine platoon formations using detailed map information. The lead vehicle may send a query message to a smart city system or device to determine current platoon limitations (such as roadwork or traffic conditions) and available RSUs. A platoon leader vehicle may send selected route and formation information and ETA estimates to each RSU along the selected route and to a smart city traffic management service.

For other embodiments, a platoon may indicate in a route request which vehicles may leave (or join) the platoon prior to reaching the route destination. For example, a route request may include additional information, such as the location a vehicle may depart from the platoon. For example, a route request may be divided into several sections, and for each section, the number (and type) of vehicles may be communicated. For this example, a route calculation process may determine a different recommended (or selected) route if the number of vehicles at the route destination is smaller than at a route's origin. Similarly, a route calculation process may determine a different recommended (or selected) route if the number of vehicles at the route destination is larger than at a route's origin.

For another embodiment, if the destination of the platoon is in an area where the platoon or type of platoon is not allowed, the platoon may use smart city routing to get near the destination and continue as separate vehicles after that point.

For another embodiment, a smart city system or device may communicate to the platoon a suggested platoon size, a maximum number of vehicles allowed for a platoon, or a platoon configuration restriction. A platoon may be split into two platoons, if available, before entering a city.

For another embodiment, a route may be selected based on the time of arrival of the platoon at a route's destination.

Use Cases

In an exemplary use case for at least one embodiment, in the late evening, a vehicle platoon approaches a city, and the operator of the leading vehicle notices that an RPP application has automatically started and is sending a route request to the smart city. After a few seconds, a recommended route appears on a human-machine interface (HMI) in the lead vehicle. The operator notices that the route goes through the center of the city and that there are multiple roadside units available to support the platoon through traffic lights. While traversing the route, no alerts are received by the leading vehicle. Also, no traffic jams and very few pedestrians are seen. A route plan includes a route section where platoon formation is one lane, and reorganization locations are communicated with other instructions for the platoon. The operator accepts this recommendation, and the RPP application transmits this data to a platoon management system. The platoon management system executes the instructions for the platoon. The operator continues to monitor the HMI for messages while the platoon traverses (or travels) efficiently through the city.

Network Architecture

A wireless transmit/receive unit (WTRU) may be used as a platoon vehicle communications device in embodiments described herein. The network architecture shown in FIGS. 8A to 8F may be used as a wide area communication network, as shown in FIG. 1.

Figure 8A:
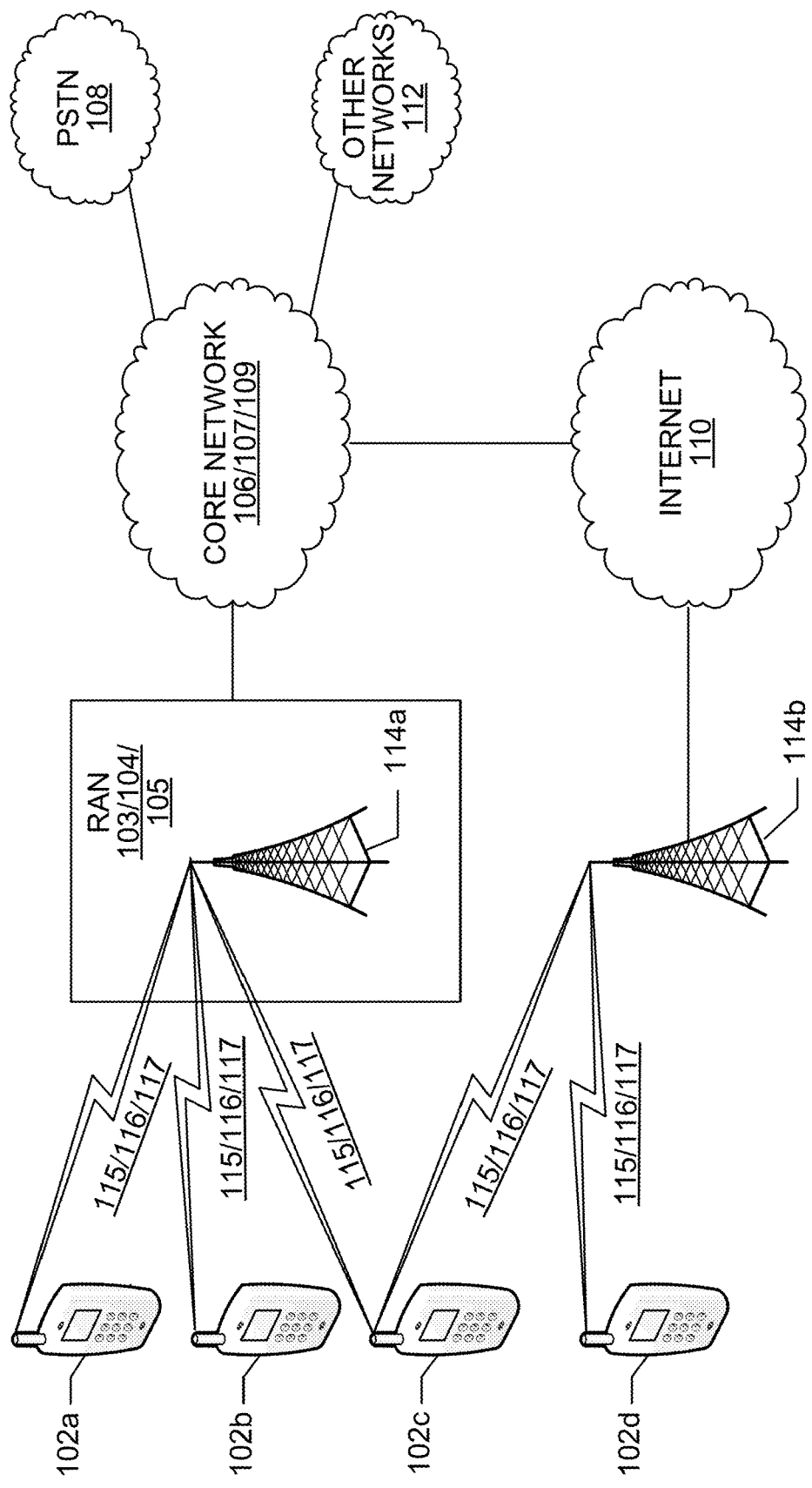
FIG. 8A depicts an example communications system in which one or more disclosed embodiments may be implemented.

FIG. 8A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors.

Thus, in one embodiment, the base station 114a may include three transceivers, one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 8A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 8A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 8A, the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, and the WTRUs 102a, 102b, 102c, 102d may include multiple transceivers for communicating with different wireless networks over different wireless links. For example, the WTRU 102c shown in FIG. 8A may be configured to communicate with the base station 114a, which may employ a cellular-based radio technology, and with the base station 114b, which may employ an IEEE 802 radio technology.

Figure 8B:
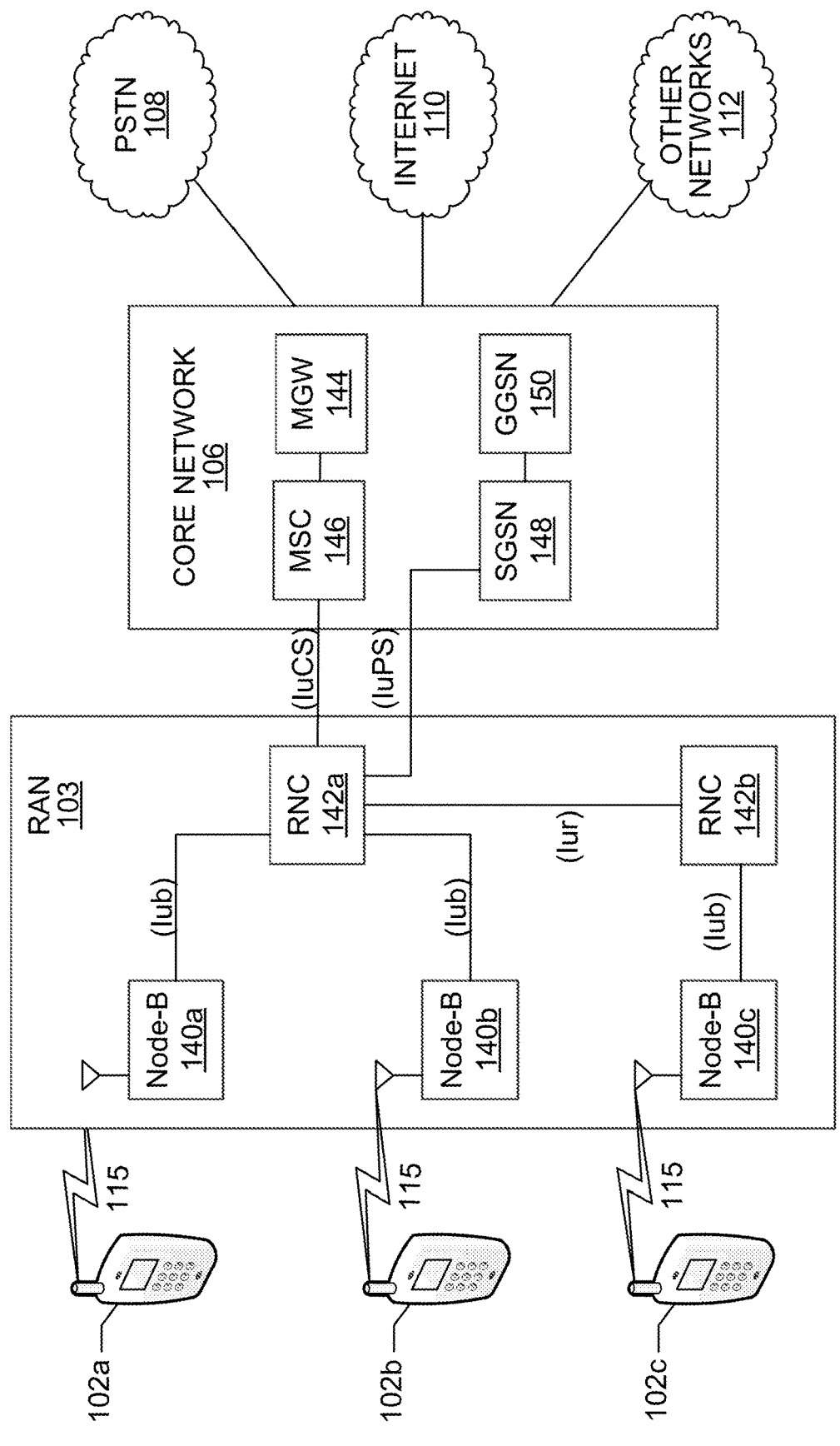
FIG. 8B depicts an example radio access network (RAN) and an example core network that may be used within the communications system of FIG. 8A.

FIG. 8B is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 8B, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. The RAN 103 may include any number of Node-Bs and RNCs while remaining consistent with an embodiment.

As shown in FIG. 8B, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which the RNC is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 8B may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional landline communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between the WTRUs 102*a*, 102*b*, 102*c* and IP-enabled devices.

As noted above, the core network 106 may also be connected to the networks 112, which may include other wired and/or wireless networks that are owned and/or operated by other service providers.

Figure 8C:
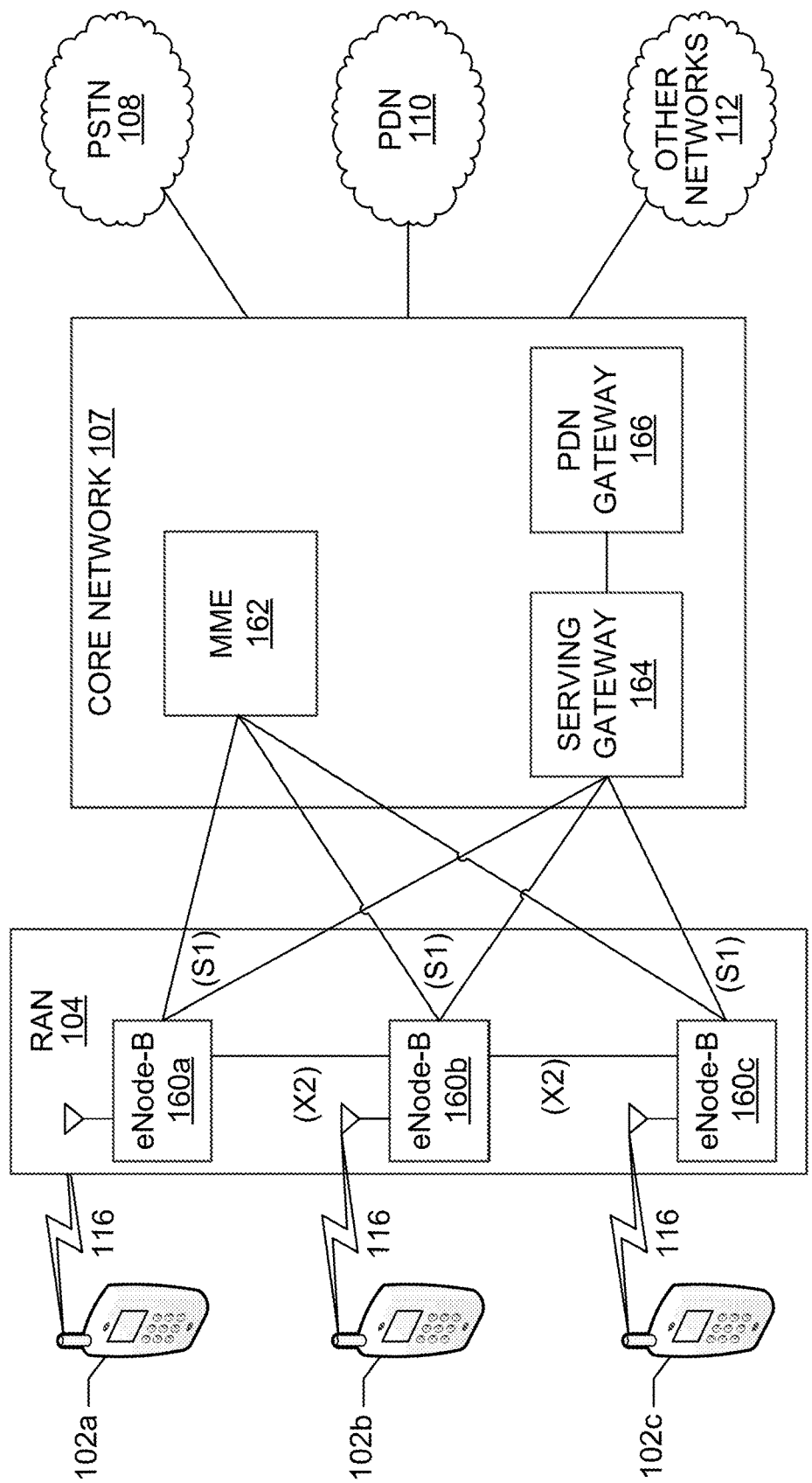
FIG. 8C depicts a second example RAN and a second example core network that may be used within the communications system of FIG. 8A.

FIG. 8C is a system diagram of the RAN 104 and the core network 107 according to an embodiment. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode Bs 160*a*, 160*b*, 160*c*, though the RAN 104 may include any number of eNode Bs while remaining consistent with an embodiment. The eNode Bs 160*a*, 160*b*, 160*c* may each include one or more transceivers for communicating with the WTRUs 102*a*, 102*b*, 102*c* over the air interface 116. In one embodiment, the eNode Bs 160*a*, 160*b*, 160*c* may implement MIMO technology. Thus, the eNode B 160*a*, for example, may use multiple antennas to transmit wireless signals to, and receive wireless signals from, the WTRU 102*a*.

Each of the eNode Bs 160*a*, 160*b*, 160*c* may be associated with a particular cell (not shown) and may be configured to handle radio-resource-management decisions, handover decisions, scheduling of users in the uplink and/or downlink, and the like. As shown in FIG. 8C, the eNode Bs 160*a*, 160*b*, 160*c* may communicate with one another over an X2 interface.

The core network 107 shown in FIG. 8C may include a mobility management entity (MME) 162, a serving gateway 164, and a packet data network (PDN) gateway 166. While each of the foregoing elements are depicted as part of the core network 107, any one of these elements may be owned and/or operated by an entity other than the core network operator.

The MME 162 may be connected to each of the eNode Bs 160*a*, 160*b*, 160*c* in the RAN 104 via an S1 interface and may serve as a control node. For example, the MME 162 may be responsible for authenticating users of the VVTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging if downlink data is available for the VVTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the VVTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the VVTRUs 102*a*, 102*b*, 102*c* with access to circuit-switched networks, such as the PSTN 108, to facilitate communications between the VVTRUs 102*a*, 102*b*, 102*c* and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired and/or wireless networks that are owned and/or operated by other service providers.

Figure 8D:
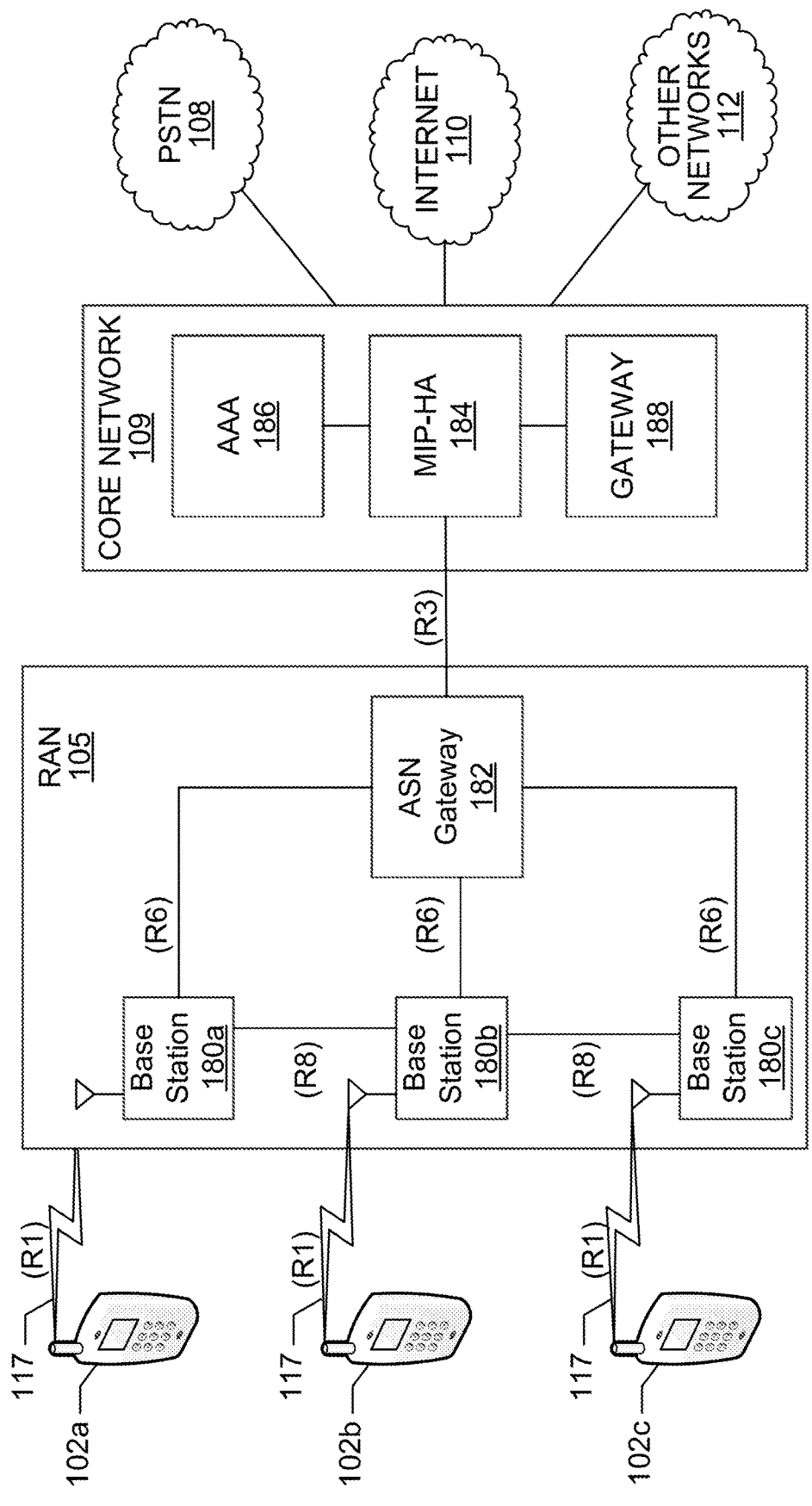
FIG. 8D depicts a third example RAN and a third example core network that may be used within the communications system of FIG. 8A.

FIG. 8D is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 8D, the RAN 105 may include base stations 180*a*, 180*b*, 180*c*, and an ASN gateway 182, though the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility-management functions, such as handoff triggering, tunnel establishment, radio-resource management, traffic classification, quality-of-service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point (not shown), which may be used for authentication, authorization, IP-host-configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 8D, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 8D, the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 8E:
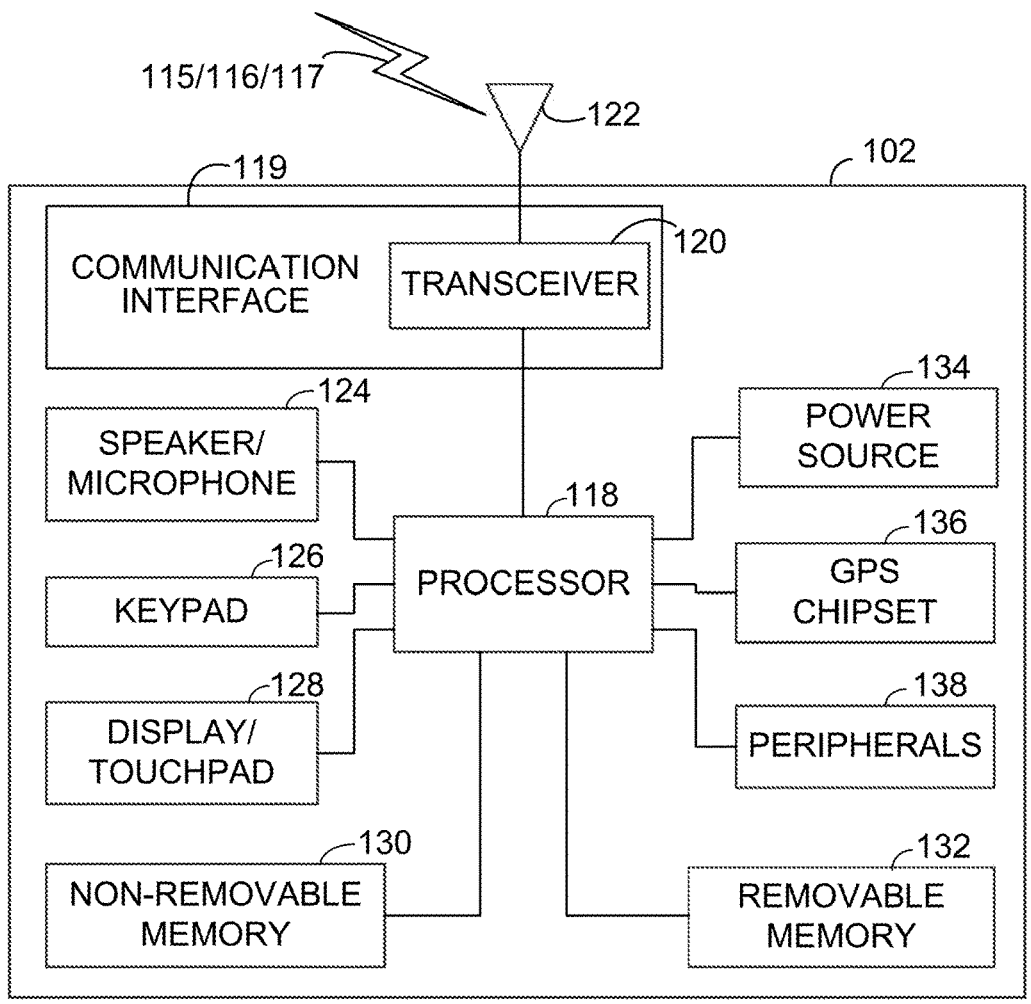
FIG. 8E depicts an example wireless transmit/receive unit (WTRU) that may be used within the communications system of FIG. 8A.

FIG. 8E is a system diagram of an example WTRU 102. As shown in FIG. 8E, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8E and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8E depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 8E as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8F:
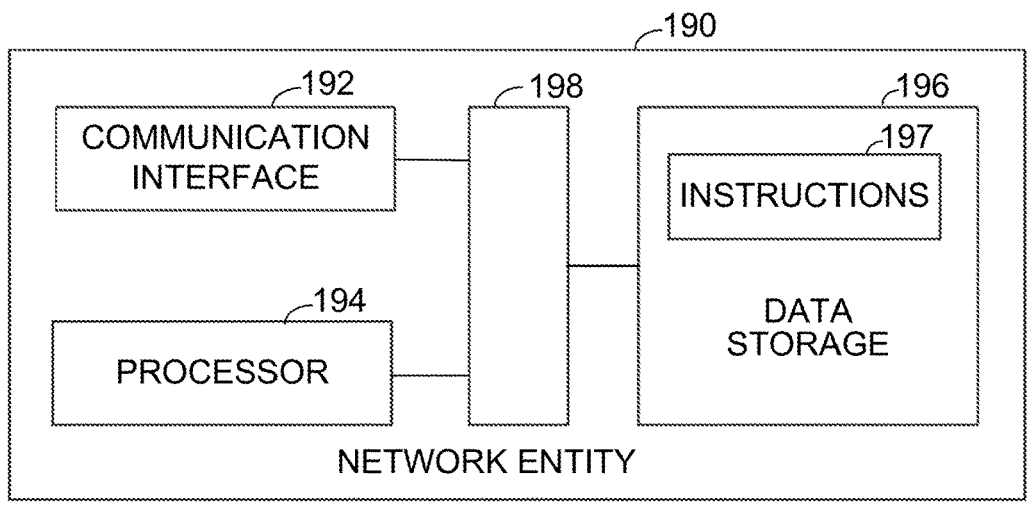
FIG. 8F depicts an exemplary network entity that may be used within the communication system of FIG. 8A.

FIG. 8F depicts an example network entity 190 that may be used within the communication system 100 of FIG. 8A. As depicted in FIG. 8F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (which may include multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 8F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 8F. In some embodiments, one or more of such functions are carried out by a set of multiple network entities in combination, where each network entity has a structure similar to that of network entity 190 of FIG. 8F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node-B 140a, Node-B 140b, Node-B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP-HA 184, AAA 186, and gateway 188. And certainly other network entities and/or combinations of network entities may be used in various embodiments for carrying out the network-entity functions described herein, as the foregoing list is provided by way of example and not by way of limitation.

Note that various hardware elements of one or more of the described embodiments are referred to as "modules" that perform or execute various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (hardwired) instructions, firmware instructions, software instructions, and/or the like, and may be stored in any suitable non-transitory computer-readable medium or media, such as commonly referred to as RAM or ROM.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, read-only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for selecting a route for a group of autonomous vehicles, comprising:
   identifying a plurality of available platoon configurations for the group of autonomous vehicles;
   determining a plurality of route options from a first location to a second location, each route option comprising a plurality of segments;
   determining, for each of the plurality of segments of the plurality of route options, whether the respective segment supports at least one of the identified platoon configurations;
   selecting, from among the plurality of route options, a route for which each segment of the selected route has been determined to support at least one of the identified platoon configurations; and
   communicating the selected route to at least one vehicle in the group of autonomous vehicles; and
   controlling the at least one vehicle in the group of autonomous vehicles along the selected route.

2. The method of claim 1, further comprising:
   selecting, for each segment along the selected route, a corresponding platoon configuration that is supported by that segment; and
   communicating the selected platoon configurations to the at least one vehicle in the group of vehicles.

3. The method of claim 2, wherein communicating the selected platoon configurations occurs before the group of vehicles traverses the selected route.

4. The method of claim 1, further comprising identifying at least a first road-side unit (RSU) along at least a first one of the route options, wherein the first route option is selected as the selected route option only if a determination is made that the first RSU supports at least one of the identified platoon configurations.

5. The method of claim 4, wherein determining whether the first RSU supports at least one of the identified platoon configurations comprises determining whether the RSU is capable of instructing a traffic light associated with the first RSU to increase a green light time to accommodate at least one platoon configuration of the group of vehicles.

6. The method of claim 1, wherein selecting the route comprises:
   eliminating route options from the plurality of route options that contain at least one segment that does not support at least one platoon configuration of the group of autonomous vehicles;
   calculating a route score for each of the plurality of route options not eliminated; and
   selecting the route from the plurality of route options wherein the route score of the selected route is above a threshold.

7. The method of claim 6, further comprising querying a service to identify, for at least one of the segments of the plurality of route options, information specifying at least one platoon configuration supported by the segment.

8. The method of claim 6, wherein calculating the route score is based in part on a vehicle category score for each vehicle in the group of autonomous vehicles, a level of automation for each vehicle in the group of autonomous vehicles, and a maximum number of vehicles allowed in a platoon for each segment of the plurality of route options not eliminated.

9. The method of claim 6, wherein selecting the route is based further on which vehicles of the group will leave the group prior to arriving at the second location.

10. The method of claim 6, wherein selecting the route is based in part on time of arrival of the group of autonomous vehicles at the second location.

11. The method of claim 1, wherein determining whether the respective segment supports at least one of the identified platoon configurations comprises determining if at least one of the identified platoon configurations has a platoon length that is less than a maximum platoon length for the respective segment.

12. The method of claim 1, further comprising receiving information restricting platoon size for a segment of at least one route of the plurality of route options, wherein selecting the route is based in part on the received information restricting platoon size.

13. The method of claim 1, further comprising navigating the selected route.

14. The method of claim 1, wherein identifying the plurality of available platoon configurations is based in part on quantity of vehicles in the group, length of vehicles in the group, and a level of automation for each vehicle.

15. A device comprising:
    a processor; and
    a non-transitory computer-readable medium storing instructions that are operative, when executed on the processor, to cause the device to:
      identify a plurality of available platoon configurations for the group of autonomous vehicles;
      determine, a plurality of route options from a first location to a second location, each route option comprising a plurality of segments;
      determine, for the plurality of segments of the plurality of route options, whether the respective segment supports at least one of the identified platoon configurations;
      select, from among the plurality of route options, a route for which each segment of the selected route has been determined to support at least one of the identified platoon configurations; and
      communicate the selected route to at least one vehicle in the group of autonomous vehicles; and
      control the at least one vehicle in the group of autonomous vehicles along the selected route.

16. The device of claim 15, wherein the instructions are further operative, when executed by the processor, to cause the apparatus to:
    identify at least a first road-side unit (RSU) along at least a first one of the route options,
    wherein the first route option is selected as the selected route option only if a determination is made that the first RSU supports at least one of the identified platoon configurations.

17. The device of claim 15, wherein selecting the route comprises:
    eliminating route options from the plurality of route options that contain at least one segment that does not support at least one platoon configuration of the group of autonomous vehicles;
    calculating a route score for each of the plurality of route options not eliminated; and selecting the route from the plurality of route options wherein the route score of the selected route is above a threshold.

18. The device of claim 15, wherein determining whether the respective segment supports at least one of the identified platoon configurations comprises determining if at least one of the identified platoon configurations has a platoon length that is less than a maximum platoon length for the respective segment.

19. The device of claim 15, wherein the instructions are further operative, when executed by the processor, to cause the apparatus to:
receive information restricting platoon size for a segment of at least one route of the plurality of route options, wherein selecting the route is based in part on the received information restricting platoon size.

20. The device of claim 15, wherein identifying the plurality of available platoon configurations is based in part on quantity of vehicles in the group, length of vehicles in the group, and a level of automation for each vehicle.

* * * * *